US006962222B2

(12) United States Patent
Kirihata

(10) Patent No.: US 6,962,222 B2
(45) Date of Patent: Nov. 8, 2005

(54) MOBILE AGRICULTURAL MACHINERY

(75) Inventor: Toshinori Kirihata, Osaka (JP)

(73) Assignee: Yanmar Agricultural Equipment Co., Ltd., Osaka (JP)

( * ) Notice: Subject to any disclaimer, the term of this patent is extended or adjusted under 35 U.S.C. 154(b) by 0 days.

(21) Appl. No.: 10/343,441

(22) PCT Filed: Aug. 6, 2001

(86) PCT No.: PCT/JP01/06766

§ 371 (c)(1),
(2), (4) Date: Jan. 29, 2003

(87) PCT Pub. No.: WO02/14140

PCT Pub. Date: Feb. 21, 2002

(65) Prior Publication Data

US 2003/0161687 A1 Aug. 28, 2003

(30) Foreign Application Priority Data

Aug. 10, 2000 (JP) .............................. 2000-242703

(51) Int. Cl.[7] .......................................... B62D 55/112
(52) U.S. Cl. ...................... 180/9.46; 180/9.21; 180/9.5
(58) Field of Search ............................... 180/9.1, 9.21, 180/9.28, 9.3, 9.46, 9.5

(56) References Cited

U.S. PATENT DOCUMENTS

| 3,863,727 | A | * | 2/1975 | Michrina | 180/9.5 |
|---|---|---|---|---|---|
| 3,938,605 | A | * | 2/1976 | Koch | 180/9.5 |
| 4,871,052 | A | * | 10/1989 | Huber | 193/35 MD |
| 4,893,883 | A | * | 1/1990 | Satzler | 305/146 |
| 4,949,800 | A | * | 8/1990 | Virly | 180/9.21 |
| 5,191,952 | A | * | 3/1993 | Satzler et al. | 180/9.52 |
| 5,775,447 | A | * | 7/1998 | Dester et al. | 180/9.1 |
| 6,024,183 | A | * | 2/2000 | Dietz et al. | 180/9.1 |
| 6,164,399 | A | * | 12/2000 | Bays | 180/9.5 |
| RE37,174 | E | * | 5/2001 | Grawey et al. | 180/9.21 |
| 6,334,496 | B1 | * | 1/2002 | Hiraki et al. | 180/9.5 |

FOREIGN PATENT DOCUMENTS

| JP | 63-188284 | 12/1988 |
|---|---|---|
| JP | 1-142383 | 9/1989 |
| JP | 2-80084 | 6/1990 |
| JP | 5-82772 | 11/1993 |

* cited by examiner

Primary Examiner—Lesley D. Morris
Assistant Examiner—L. Lum
(74) Attorney, Agent, or Firm—Jordan and Hamburg LLP

(57) ABSTRACT

A mobile agricultural machine, particularly for use as a combine, which demonstrates improved operational movement and travel performance characteristics, and is capable of easily changing direction during operation, includes right and left travel crawlers, supported by drive sprockets and tension rollers, which are installed on right and left track frames through track rollers. Right and left travel frames are capable of being controllably elevated through crawler elevation arms. Tension rollers provide movement to the travel crawlers in a vertical direction, perpendicular to the ground.

7 Claims, 29 Drawing Sheets

FIG.21
(1)
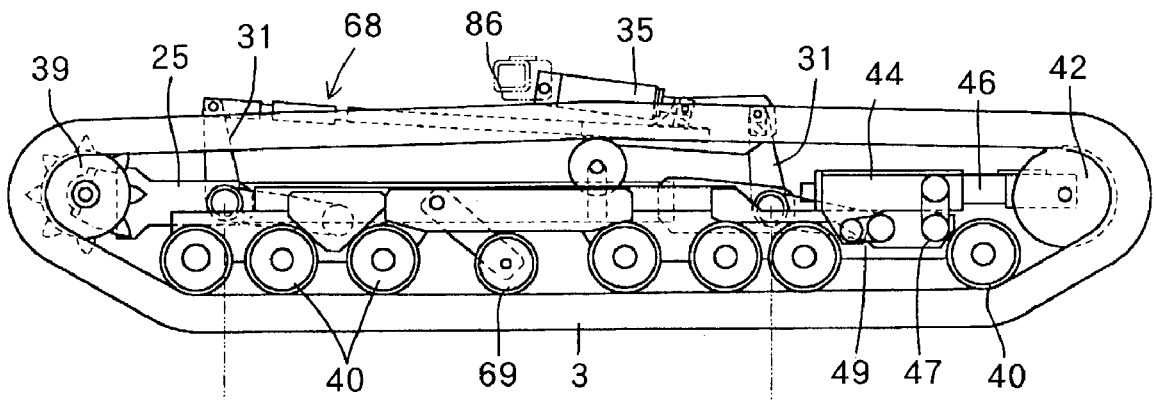
(2)
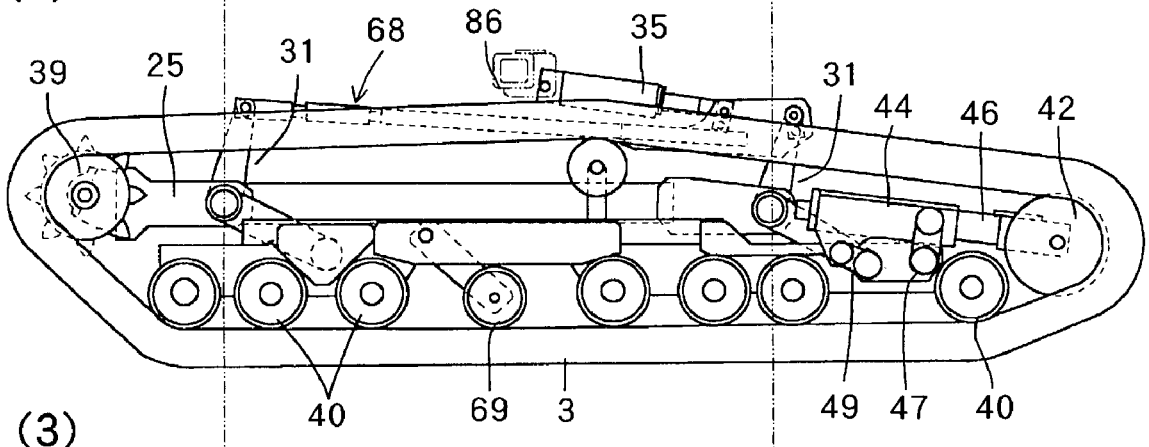
(3)
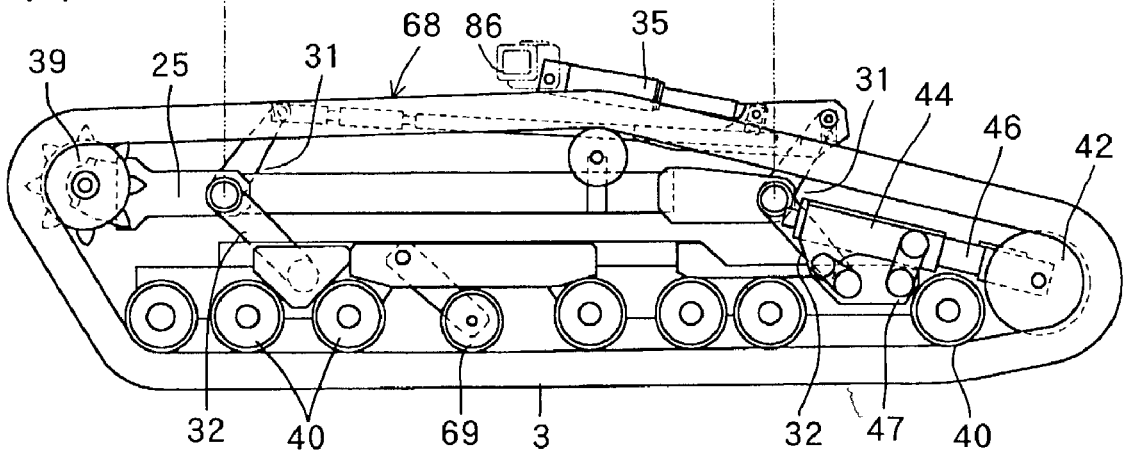

MOBILE AGRICULTURAL MACHINERY

FIELD OF THE INVENTION

The present invention relates to a mobile agricultural machine, such as a combine, for continuously reaping and simultaneously threshing grain on a farm.

BACKGROUND OF THE INVENTION

In the prior art, as shown in Japanese patent publication number 0128079, the technology includes right and left travel crawlers supported by drive sprockets and tension rollers installed to the right and left track frames through track rollers. The right and left track frames are installed on this machine through crawler elevation arms in a manner where the track frames are movable up and down by correcting the lateral tilt. Said prior art can prevent tension from varying by minimizing changes in the ground contact area of the right and left travel crawlers because, when this machine is elevated, the track frames are lowered in order to come close to the drive sprocket side. There are, however, problems where a shift in the center of gravity of the machine body toward the rear side of the lateral ground contact width of the travel crawler results in a tilting of the machine body backward, followed by the elevation of the moving section in front of the machine body, thus leading to a change in the reaping height, as well as problems where the backward shift in the center of gravity of the machine body increases the ground contact pressure on the rear side of the travel crawler and the backward travel facilitates the rear sides of the travel crawlers to penetrate into the earth, thus degrading the turning performance at the bare end area of a wet rice field.

SUMMARIZED DISCLOSURE OF THE INVENTION

This invention relates to a combine, wherein right and left travel crawlers 3 and 4 supported by drive sprockets 39 and tension rollers 42 are installed to the right and left track frames 1 and 2 through track rollers 40, right and left track frames 1 and 2 are installed to this machine through crawler elevation arms 31 and 32 in a manner where the elevation action is controllable, and tension rollers 42 are installed in the ground contact direction of travel crawlers 3 and 4 in a movable manner. Thus in this combine, the longitudinal ground contact length of travel crawlers 3 and 4 can be extended by movement of tension rollers 42 even if the elevation control action is performed to lower track frames 1 and 2 when, for example, a travel surface is soft like a wet rice field where the amount of penetration of travel crawlers 3 and 4 is large. Consequently, the longitudinal balance can be easily maintained by minimizing the longitudinal shift of the center of gravity of the machine body on the ground contact surface of travel crawlers 3 and 4, ground contact pressure can be lowered because of an increase in the ground contact area of travel crawlers 3 and 4, the amount of penetration of travel crawlers 3 and 4 can be reduced to easily achieve an improvement in travel performance such as a direction change, and the longitudinal ground contact length of travel crawlers 3 and 4 on a hard travel surface, such as a dry rice field and an agricultural road, can be reduced to secure the specified turning performance.

In this combine, track frames 1 and 2 are provided with link mechanisms 47 in a swingable manner, and link mechanisms 47 are provided with tension frames 44 for installing tension rollers 42 in an adjustable manner. Thus tension rollers 42 are easily movable in a direction for lowering track frames 1 and 2 while keeping track frames 1 and 2 away in an extended direction, the longitudinal ground contact length of travel crawlers 3 and 4 can be easily increased or decreased by shifting tension rollers 42 without changing the perimeter of travel crawlers 3 and 4, and simplification of the tension structure of travel crawlers 3 and 4 with improvement of travel performance can be easily achieved.

In this combine, tension frames 44 for installing tension rollers 42 in an adjustable manner are moved in linkage with the elevation control action of crawler elevation arms 31 and 32. Thus the ground contact length of travel crawlers 3 and 4 can be increased or decreased by shifting tension rollers 42 in a direction opposite the longitudinal movement of track frames 1 and 2 through an elevation control action. The change in the ground contact pressure of travel crawlers 3 and 4 associated with the elevation control action can be easily reduced, conventional problems caused by the elevation control action can be easily eliminated, and an improvement in the travel performance, such as turning ability at the bare end area of the farm, can be achieved.

In this combine, the actions that drive sprockets 39 support the front of the travel crawlers 3 and 4, allowing tension rollers 42 to support the rear of travel crawlers 3 and 4, and allowing track rollers 40 and track frames 1 and 2 to be moved longitudinally by the body lifting action of crawler elevation arms 31 and 32 through linkage with the action allowing tension rollers 42 to move in the ground contact direction of travel crawlers 3 and 4. Thus, the ground contact length can be extended toward the rear of travel crawlers 3 and 4 at the time of the elevation control action for raising the machine body. Improper penetration of the rear of travel crawlers 3 and 4 can be prevented, a tilt of the rear caused by a difference of the penetration amount between the front and the rear of travel crawlers 3 and 4 due to a conventional center of gravity shift can easily be prevented, and an improvement in the travel performance on a wet rice field can be easily achieved.

In this combine, the right and left elevation cylinders 35 are provided for individually elevating right and left track frames 1 and 2. Front and rear pistons 34 are allowed to protrude at both ends of elevation cylinders 35 to connect to front and rear crawler elevation arms, and elevation cylinders 35 are installed to the machine in a manner movable only vertically. Thus installation width in a vertical direction can be easily made compact by connecting elevation cylinders 35 between the front and rear crawler elevation arms through the front and rear pistons 34, and an improvement in the elevation control function can be easily achieved by, for example, providing elevation cylinders 35 with a double action hydraulic structure.

In this combine, tension rollers 42 providing travel crawlers 3 and 4 with tension are supported by track frames 1 and 2 through idler links 47 and 49 in a tension adjustable manner, and elevation arms 31 and 32 are connected to idler links 47 and 49 while maintaining the relative position. Thus assembling work can be done easily by properly connecting track frames 1 and 2 and tension rollers 42 to elevation cylinders 35, and the elevation control of track frames 1 and 2 can be optimized.

In this combine, tension frames 44 for mounting tension rollers 42 are formed separately from track frames 1 and 2 in order to make the relative position between track frames 1 and 2 and tension frames 44 changeable at the time of the elevation control of right and left track frames 1 and 2. Thus the durability of travel crawlers 3 and 4 can be improved by moving track frames 1 and 2 and the tension rollers 42 to absorb the change in the perimeter of the crawlers at the elevation control in order to always support travel crawlers 3 and 4 appropriately.

In this combine, tension frames 44 are connected to both right and left sides of track frames 1 and 2 through idler links 47 and 49 to provide idler links 47 and 49 with support at both ends. Thus, a strong connection can be achieved by making tension frames 46 and track frames 1 and 2 compact to improve stability in the elevation control.

In this combine, elevation arms 32 and tension frames 44 are connected through idler links 49, and idler links 49 are installed almost in parallel with the tension direction of the tension rollers 42. Thus the support shafts 33 serving as connecting shafts for connecting to tension frames 44 and idler links 49 can be prevented from being subjected to torsion caused by tension, and improvements in durability and the smooth rotation of tension frames 44 around support shafts 33 can be achieved.

In this combine, elevation arms 31 and 32 and idler links 47 and 49 are provided to minimize the change in the perimeter of travel crawlers 3 and 4. Thus drive sprockets 39, track rollers 40, and tension rollers 42 can support travel crawlers 3 and 4 appropriately without relating to the elevation control to maintain the travel performance in a stable condition.

In this combine, the pistons 88 of the elevation cylinders 35 are connected to the connecting members 34 that connect the front and rear elevation arms 31 and 32 for connecting right and left track frames 1 and 2 to the machine. Thus elevation arms 31 and 32 can be formed so as to be compact and light in comparison with a structure in which, for example, pistons 88 of the elevation cylinders 35 are directly connected to elevation arms 31 and 32, and consequently achieve common use and cost reduction of parts by forming front and rear elevation arms 31 and 32 in a same shape can be easily maintained.

In this combine, the carrier rollers 43 that guide travel crawlers 3 and 4 from the bottom are installed on the sides of the machine, and carrier rollers 43 are arranged between the front and rear elevation arms 31 and 32. Thus, carrier rollers 43 can be raised away from track frames 1 and 2 to protect the carrier rollers 43 from mud during the lowering control of track frames 1 and 2 of this machine for work in a wet rice field. Fulcrum shafts 29 and 30 of elevation arms 31 and 32 connected to the sides of the machine can be effectively prevented from interfering with crawlers 3 and 4 to maintain the travel performance in a stable condition.

In a combine, where right and left track frames 1 and 2 are supported by the machine through elevation arms 31 and 32 in a movable up and down manner, and where tension rollers 42 providing travel crawlers 3 and 4 with tension are supported by track frames 1 and 2 through idler links 47 and 49 in a tension adjustable manner, idler frames 46 having tension rollers 42 are connected to tension frames 44 in an extendable manner, and idler frames 46 are indirectly connected to tension frames 44 through tension bolts 45 and nuts 78. Thus, the performance can be easily maintained in a stable condition by replacing only the tension bolts 45 even if the extension screws of idler frames 46 are damaged.

In this combine, nuts 78 are applied to an almost central part of idler frames 46 to press idler frames 46. Thus, smooth extension can be achieved by preventing the idler frames 46 from sticking in tension frames 44.

In this combine, bolt receiving members 75 supporting tension bolts 45 are connected to tension frames 44 through fastening bolts 74, and fastening bolts 74 are arranged in an equal pitch at a symmetrical position from the center of tension bolts 45. Thus, the support stability of tension bolts 45 can be improved by almost equalizing the force acting on each fastening bolt 74.

In a combine, where right and left track frames 1 and 2 are supported by the machine through elevation arms 31 and 32 in a movable up and down manner, and where tension frames 44 of tension rollers 42 providing travel crawlers 3 and 4 with tension are supported by track frames 1 and 2 through idler links 47 and 49 in a tension adjustable manner, the top surfaces of track frames 1 and 2 below tension frames 44 are provided with openings 80 for allowing mud to fall. Thus elevation control accuracy in correcting the lateral tilt of the machine can be improved by allowing mud and stones to immediately fall down to prevent problems such as elevation control failure even if such mud and stones are caught in the clearance between track frames 1 and 2 and tension frames 44.

In this combine, lower frames 25 and 26 of the machine connected to track frames 1 and 2 are provided with inside frame sections 25a and 26a installed in travel crawlers 3 and 4, and inside frame sections 25a and 26a are provided with fulcrum shaft sections 28 of elevation arms 32. Thus, mud discharge can be improved by arranging elevation arms 32 compactly inside travel crawlers 3 and 4 without allowing elevation arms 32 to protrude from travel crawlers 3 and 4.

BRIEF DESCRIPTION OF THE DRAWINGS

FIG. 21 is a diagram for explaining the elevation of the frame section of the machine.

THE BEST MODES EMBODYING THE INVENTION

Figure 1:
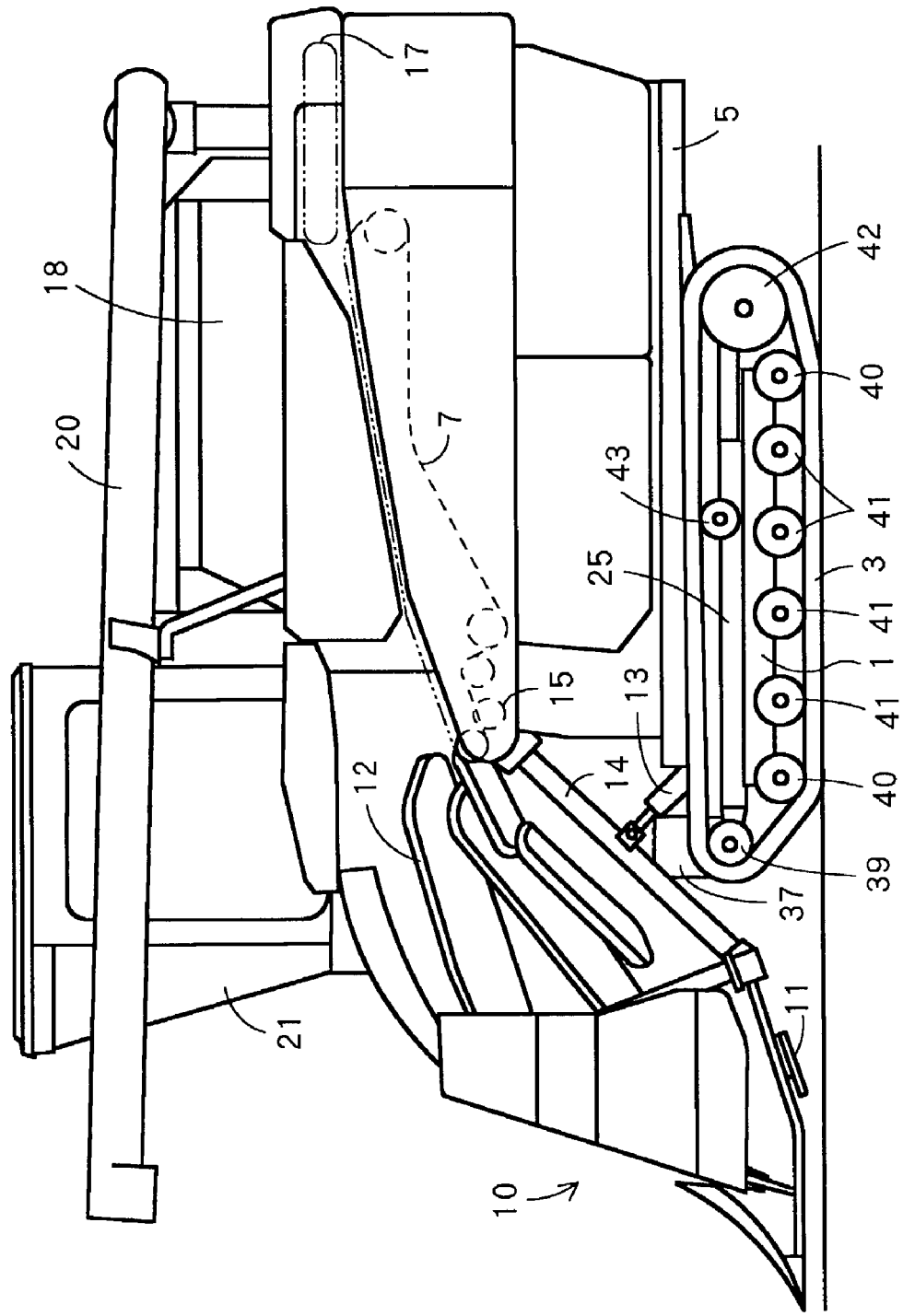
FIG. 1 is a side view shown in its entirety.
Figure 2:
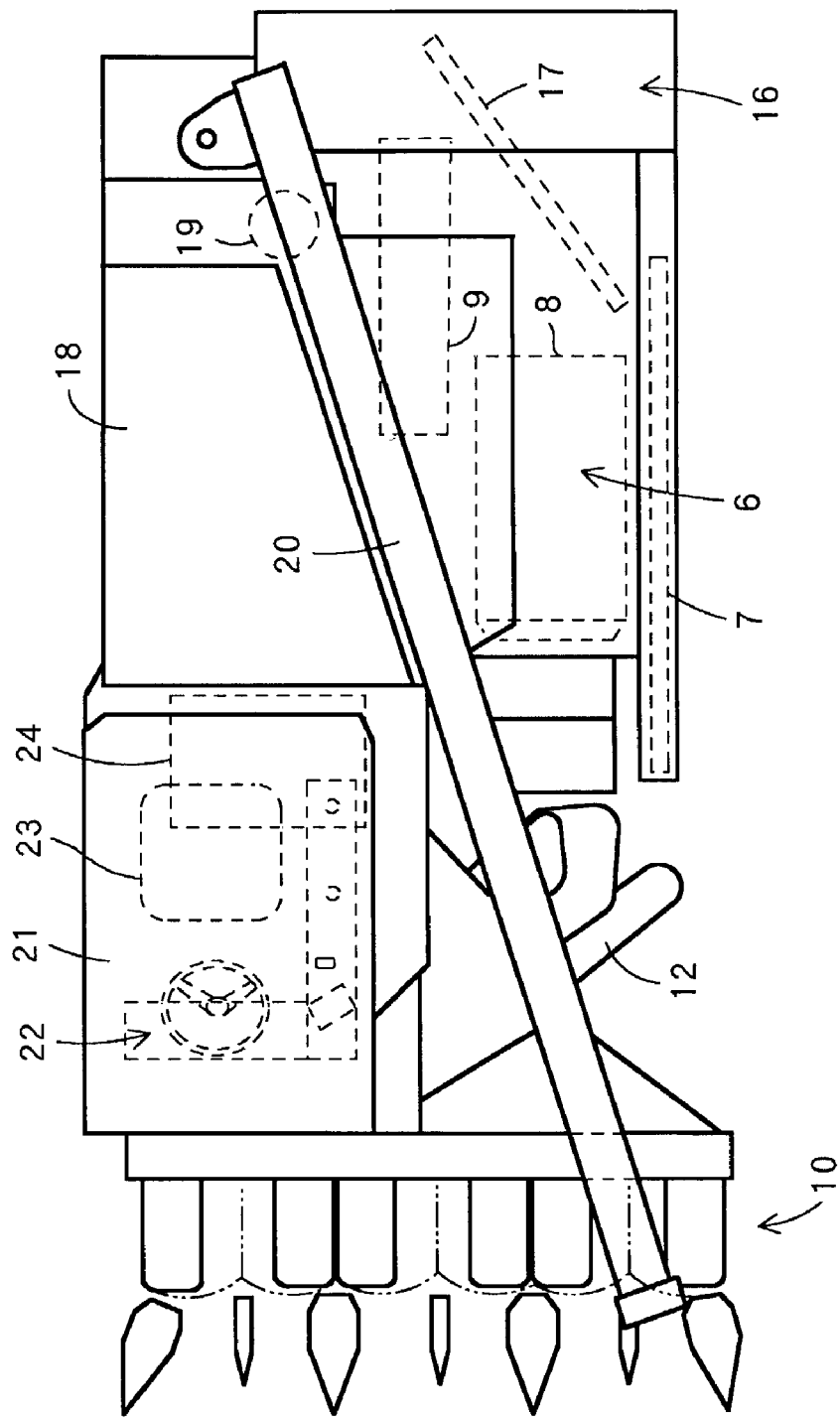
FIG. 2 is a plan view of the same.
Figure 4:
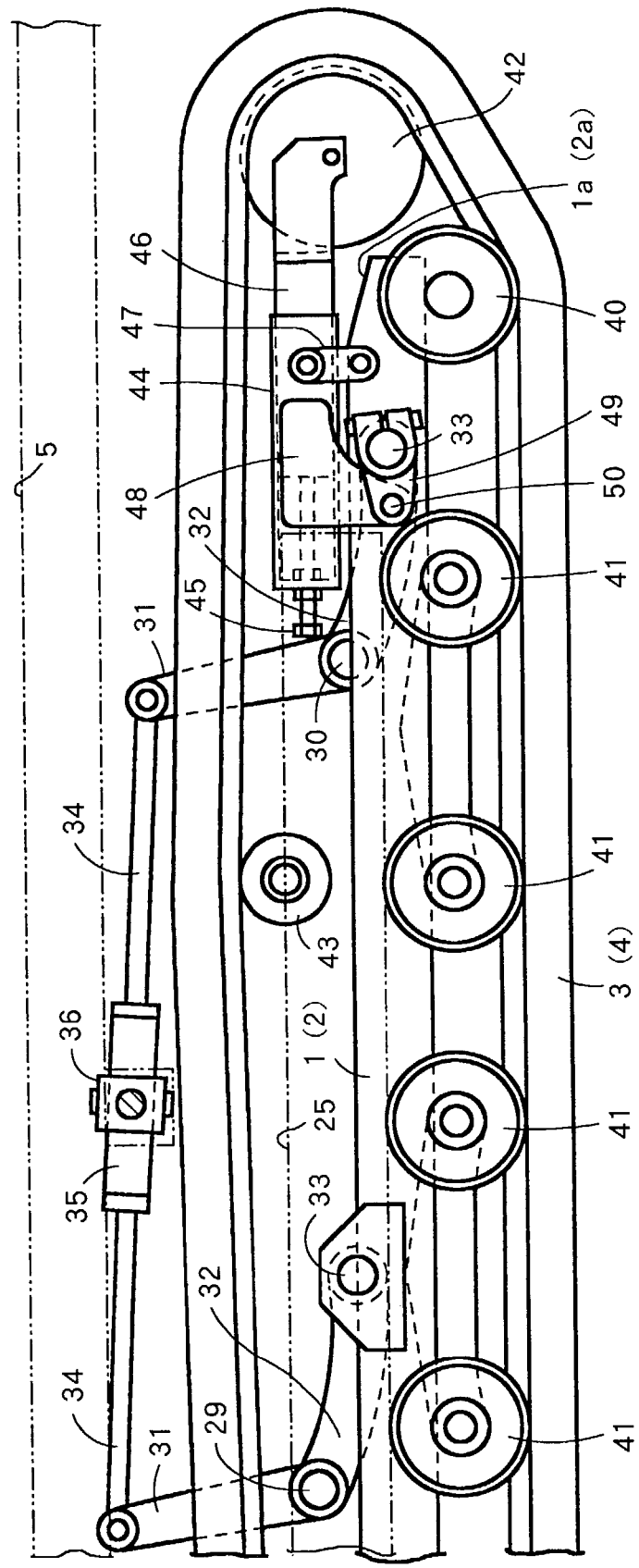
FIG. 4 is a partial enlargement view of the same.
Figure 5:
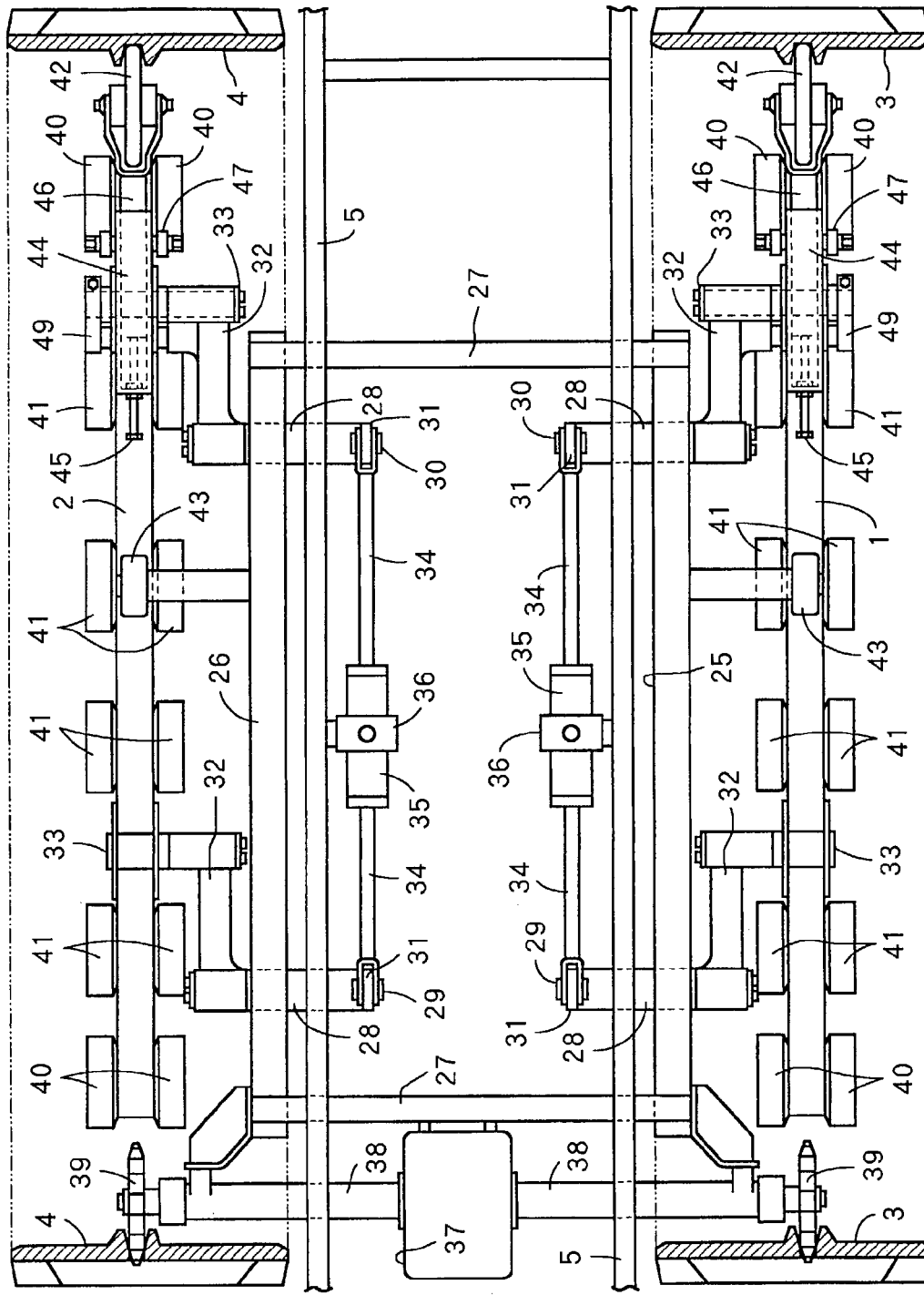
FIG. 5 is a plan view of the travel crawler section.
Figure 6:
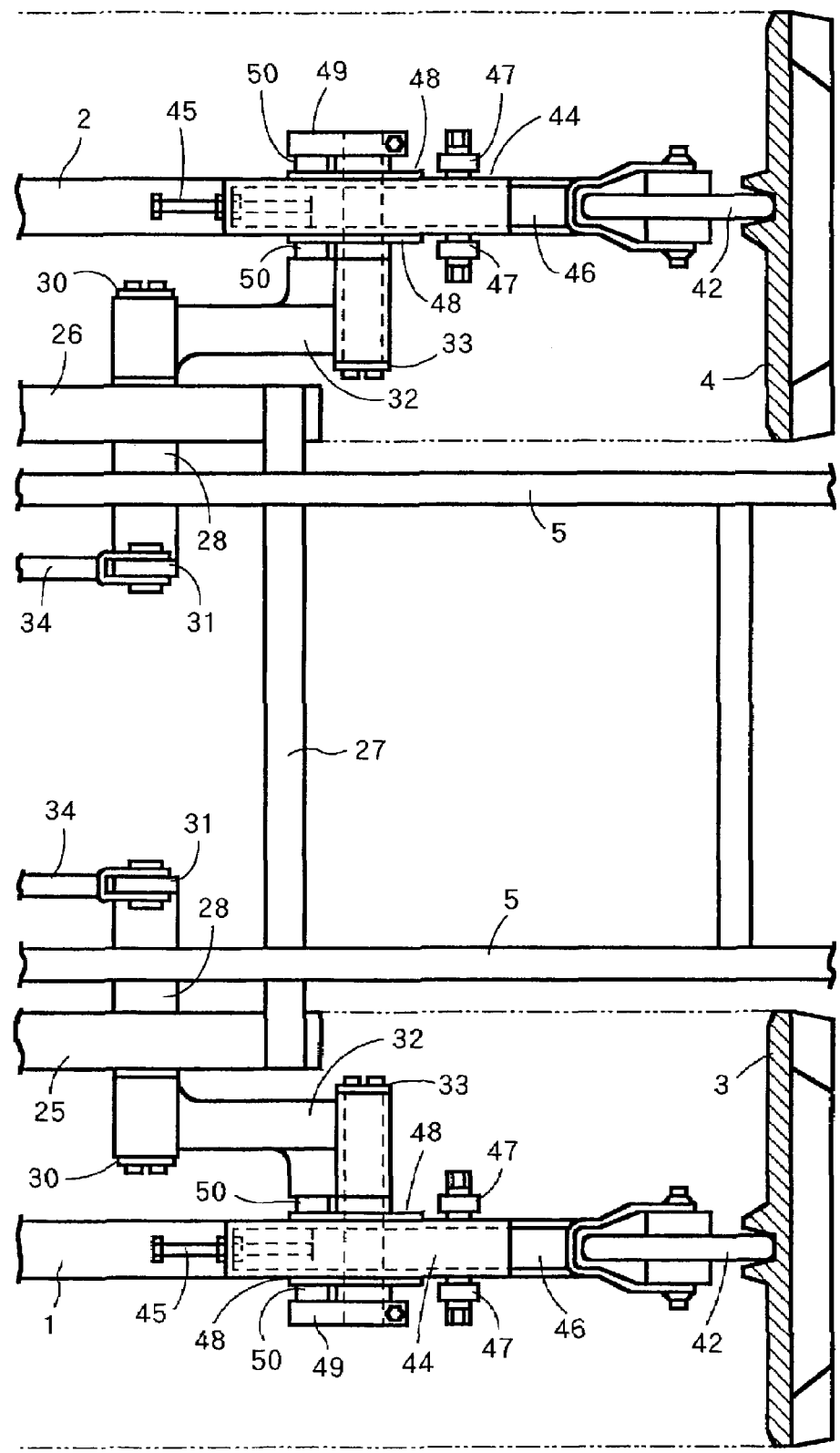
FIG. 6 is a partial enlargement view of the same.

Now some embodiments of the present invention will be described with reference to the drawings. FIG. 1 is a side view of the combine in its entirety, FIG. 2 a plan view of the same, FIG. 3 a side view of the track frame section, FIG. 4 a partial enlargement view of the same, FIG. 5 is a plan view of the same, and FIG. 6 a partial enlargement view of the same. In the Figures, the reference numerals 1 and 2 denote right and left track frames provided with right and left travel crawlers 3 and 4. The numeral 5 is a platform to be mounted on said track frames 1 and 2, numeral 6 a threshing section for which the left side is provided with the feed chain 7 and in which the handling barrel 8 and the processing barrel 9 are built. Numeral 10 is the reaping section provided with the reaping cutter 11, and the grain stalk conveying mechanism 12. Numeral 13 is the hydraulic reaping elevation cylinder for elevating the reaping section 10 around the reaping fulcrum shaft 15 through the reaping frame 14. Numeral 16 is the straw discharge cutter close to which the straw discharge chain 17 is located. Numeral 18 is the grain tank into which grains are carried from the threshing section 6 through the grain lifting cylinder 19. Numeral 20 is the discharge auger for carrying out grains in said tank 18 to the outside of the machine. Numeral 21 is the operation cabin provided with an operation section 22 with a steering wheel and the driving seat 23, and numeral 24 is an engine to be mounted under the operation cabin 21 and constructed so that reaping and threshing grain stalks are performed continuously.

A pair of right and left frames 25 and 26 of the machine are fixed on the bottom surface of said platform 5 by front and rear lateral frames 27, bearing bodies 28 are fixed on both ends of longitudinal extensions of the right and left frames 25 and 26 of the machine, front and rear fulcrum shafts 29 and 30 are supported by bearing bodies 28 in a rotatable manner, a pair of right and left upper swing arms 31 and 32 and a pair of right and left lower swing arms 31 and 32, all of which having an almost same shape and an L-shaped side view, are fixed on both ends of said fulcrum shafts 29 and 30, rear ends of lower swing arms 32 are connected, in a rotatable manner, to support shafts 33 that are supported by said track frames 1 and 2 in a rotatable manner, the upper ends of front and rear upper swing arms 31 are connected to both ends of connecting rods 34 that are extended longitudinally, hydraulic elevation cylinders 35 are installed between connecting rods 34, connecting rods 34 are pushed and pulled longitudinally by hydraulic force of elevation cylinders 35, and right and left track frames 1 and 2 are individually installed to platform 5 through a pair of right and left front swing arms 31 and 32 and a pair of right and left rear swing arms 31 and 32 in a vertically movable manner. In addition, elevation cylinders 35 are installed to platform 5 through platform seat 36.

The machine is equipped with drive sprockets 39 installed in the transmission case 37 located in front of platform 5 through the axle case 38. A plurality of track rollers 40, equalizer rollers 41 and tension rollers 42 are installed to the external sides of said track frames 1 and 2, and carrier rollers 43 are installed to frames 25 and 26 of the machine. In this machine, track frames 1 and 2 provide the ground contact sides of travel crawlers 3 and 4 with tension. The tension frames 44 installed to the rear of track frames 1 and 2 are provided with tension rollers 42 through tension adjusting bolts 45 and idler frames 46, and the tension of travel crawlers 3 and 4 is set at the rear of said tension frames 44 by adjusting the semi-fixed tension for the idler frames 46 by screwing bolts 45. Thus front and rear swing arms 31 and 32 are swung around fulcrum shafts 29 and 30 by elevation cylinders 35. Each of rollers 40, 41 and 42 and track frames 1 and 2 are elevated to elevate ground contact sides of travel crawlers 3 and 4. Therefore the right and left elevation cylinders 35 can be actuated individually by manual operation of an elevation adjusting switch installed to operation section 22 and by automatic control based on a tilt sensor that detects the lateral tilt of platform 5. Platform 5 can be kept nearly horizontal by adjusting the lateral tilt of platform 5 by changing the ground contact height of right and left travel crawlers 3 and 4.

Figure 3:
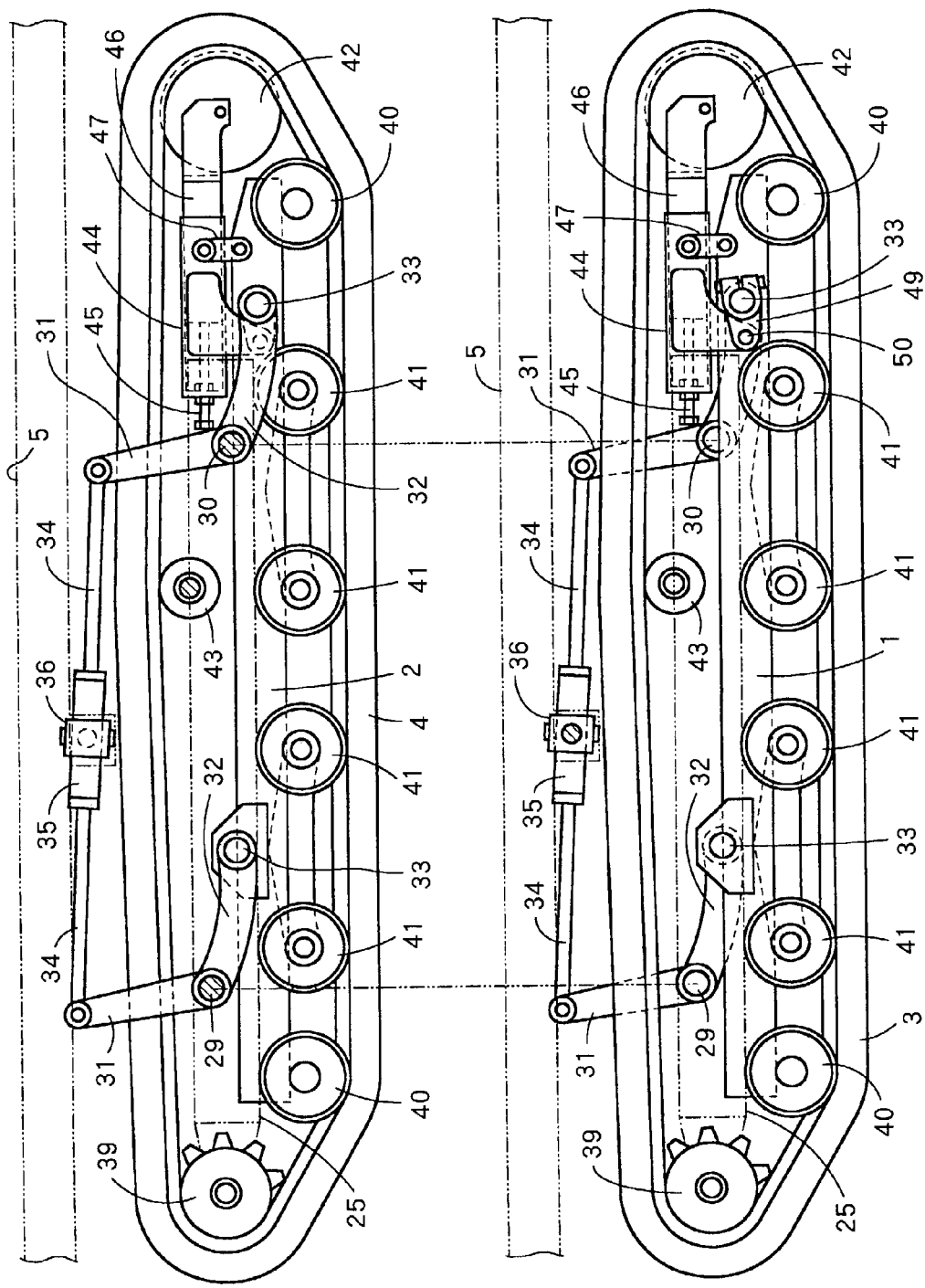
FIG. 3 is a side view of the travel crawler section.

The rear sides of tension frames 44 are connected to the rear sides of said track frames 1 and 2 through rear idler links 47 serving as a pair of right and left fulcrum links in a longitudinally movable manner. Slopes 1a and 2a with low rear ends are formed on the top of each rear end of track frames 1 and 2, a pair of right and left seat plates 48 are fixed on both sides of the front of said tension frames 44, front idler links 49 are fixed to said support shafts 33 serving as auxiliary arms at the rear of track frames 1 and 2, and rear lower swing arms 32 and front idler links 49 are connected to seat plates 48 through shafts 50 in a rotatable manner. Thus track frames 1 and 2 are located as close to platform 5 as possible, and in a condition where the elevation control action by elevation cylinders 35 is stopped. In a condition where the machine is moving on a hard road surface such as a dry rice field and an agricultural road, the rear idler links 47 are installed almost vertically, the front idler links 49 are protruded almost horizontally toward the front of support shafts 33, shafts 50 connecting lower swing arms 32 and support shafts 33 to seat plate 48 are supported at a height almost identical to that of support shafts 33, and travel crawlers 3 and 4 are allowed to be in contact with the ground between track rollers 40 at the front and rear ends of track frames 1 and 2, as shown in FIGS. 3 and 4. At this time, the ratio of ground contact length L of right and left travel crawlers 3 and 4 to gauge width B, namely L/B, is set at 1.5 or less to minimize the turning radius, thereby eliminating problems that increase the turning radius and increase the turning resistance moment if said ratio L/B becomes larger than, for example, 1.7.

Figure 7:
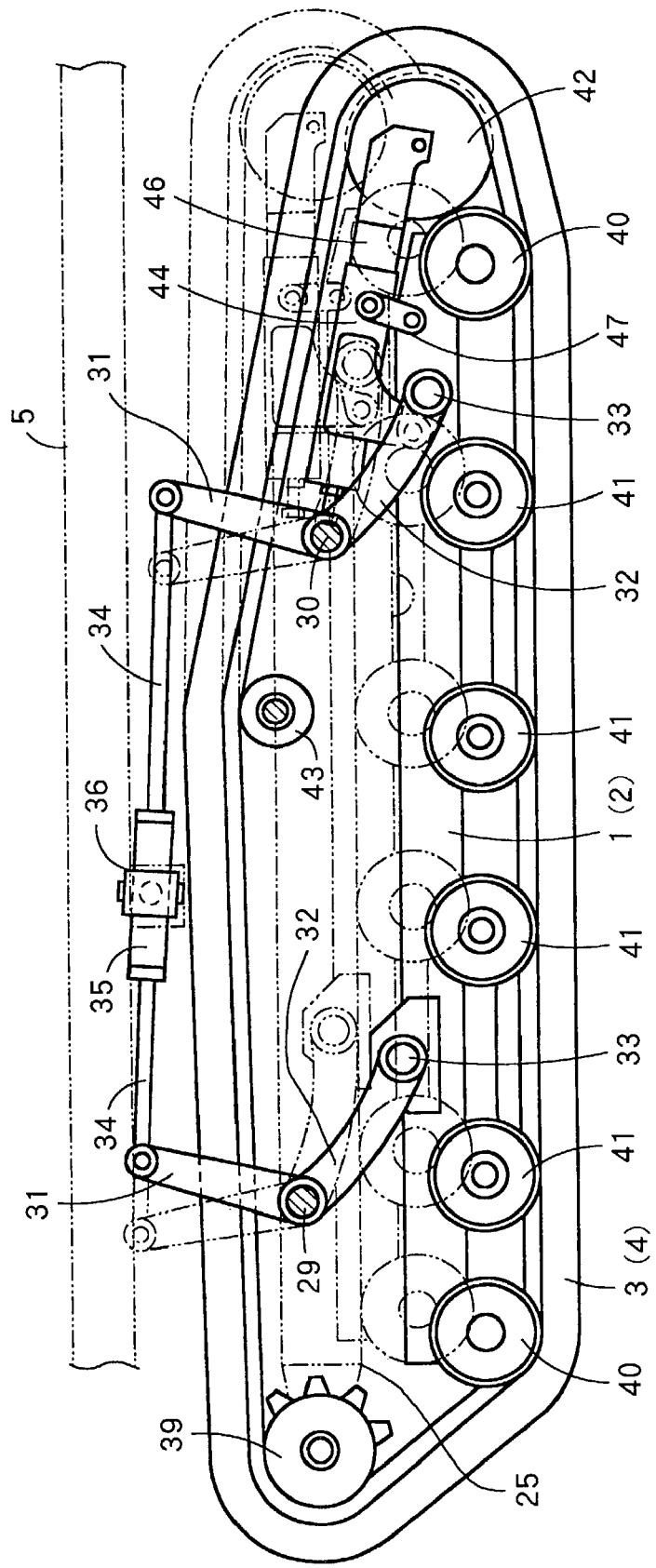
FIG. 7 is a diagram for explaining the elevation control action of the travel crawler section.
Figure 8:
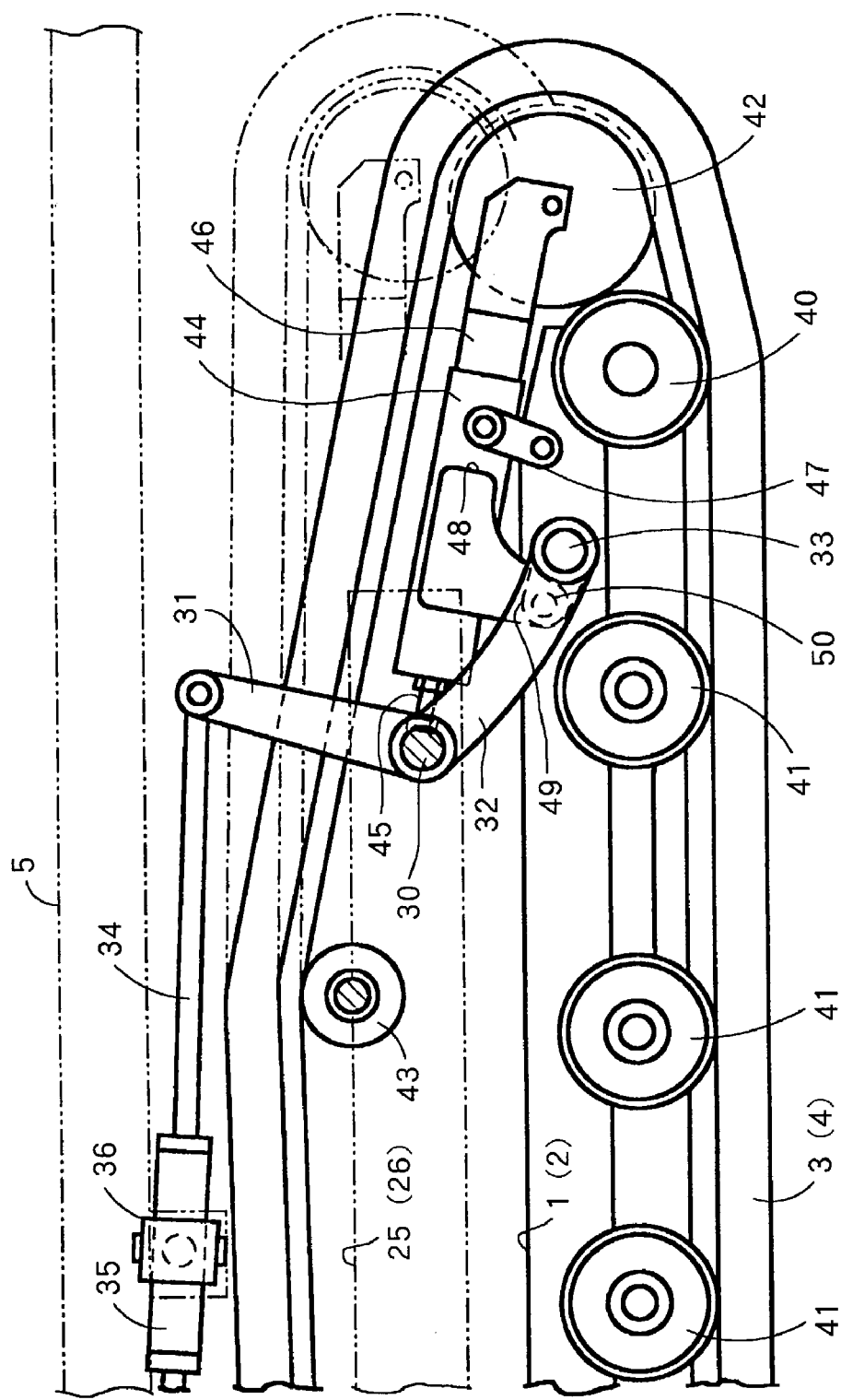
FIG. 8 is a partial enlargement view of the same.
Figure 9:
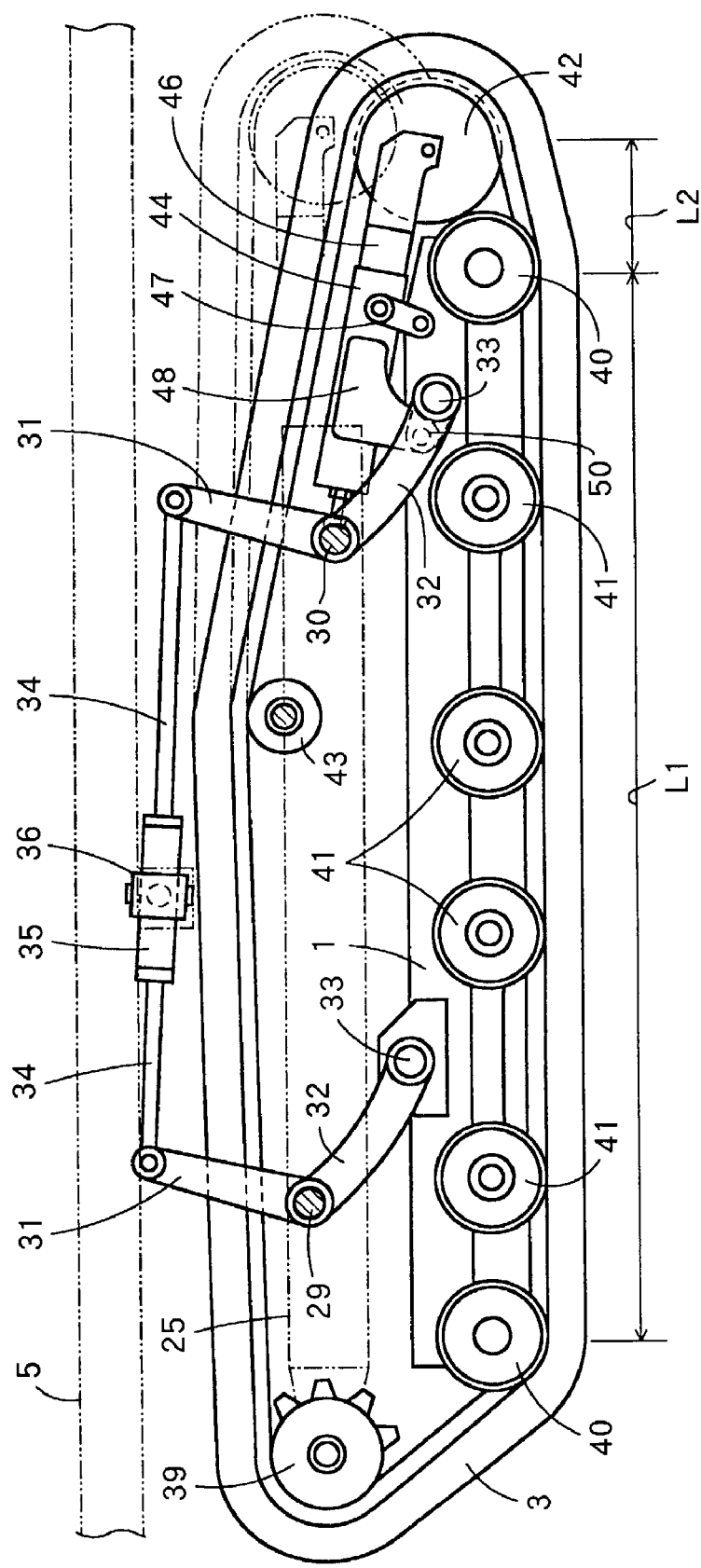
FIG. 9 is a side view of the same.
Figure 10:
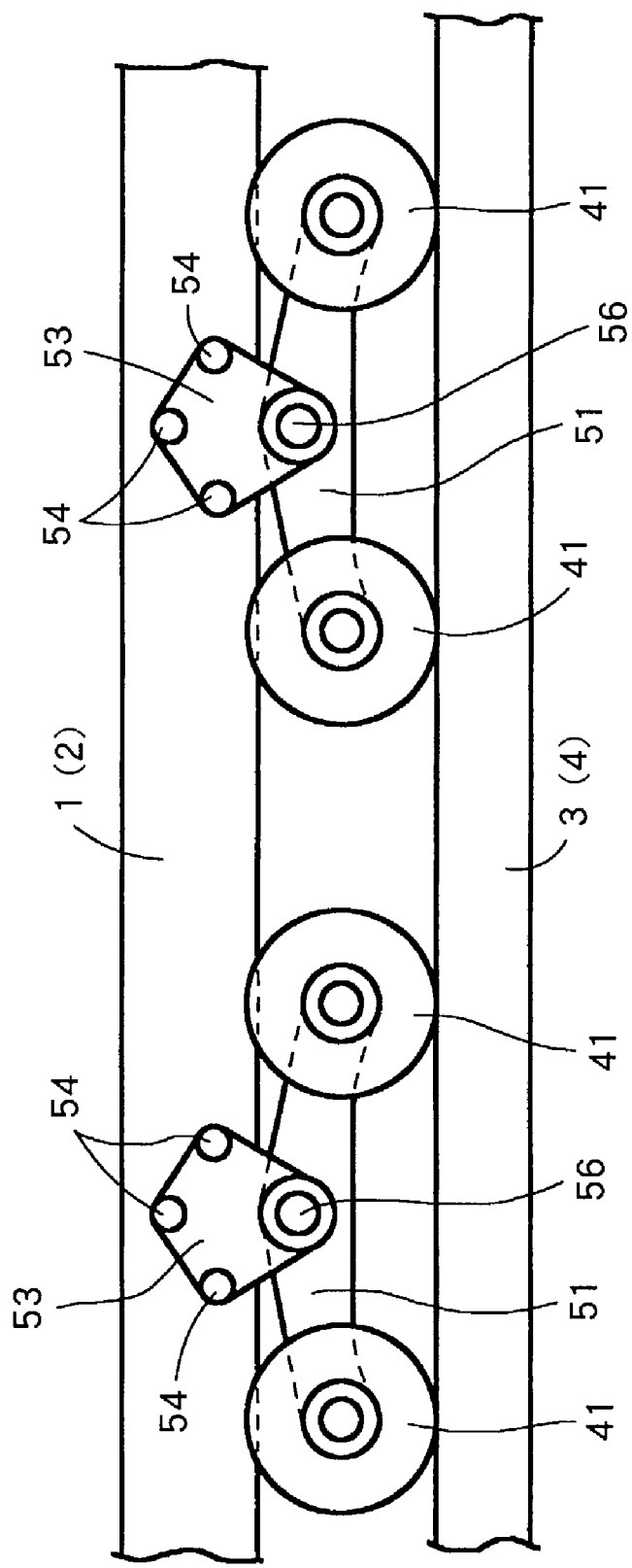
FIG. 10 is a side view of the equalizer roller section.
Figure 11:
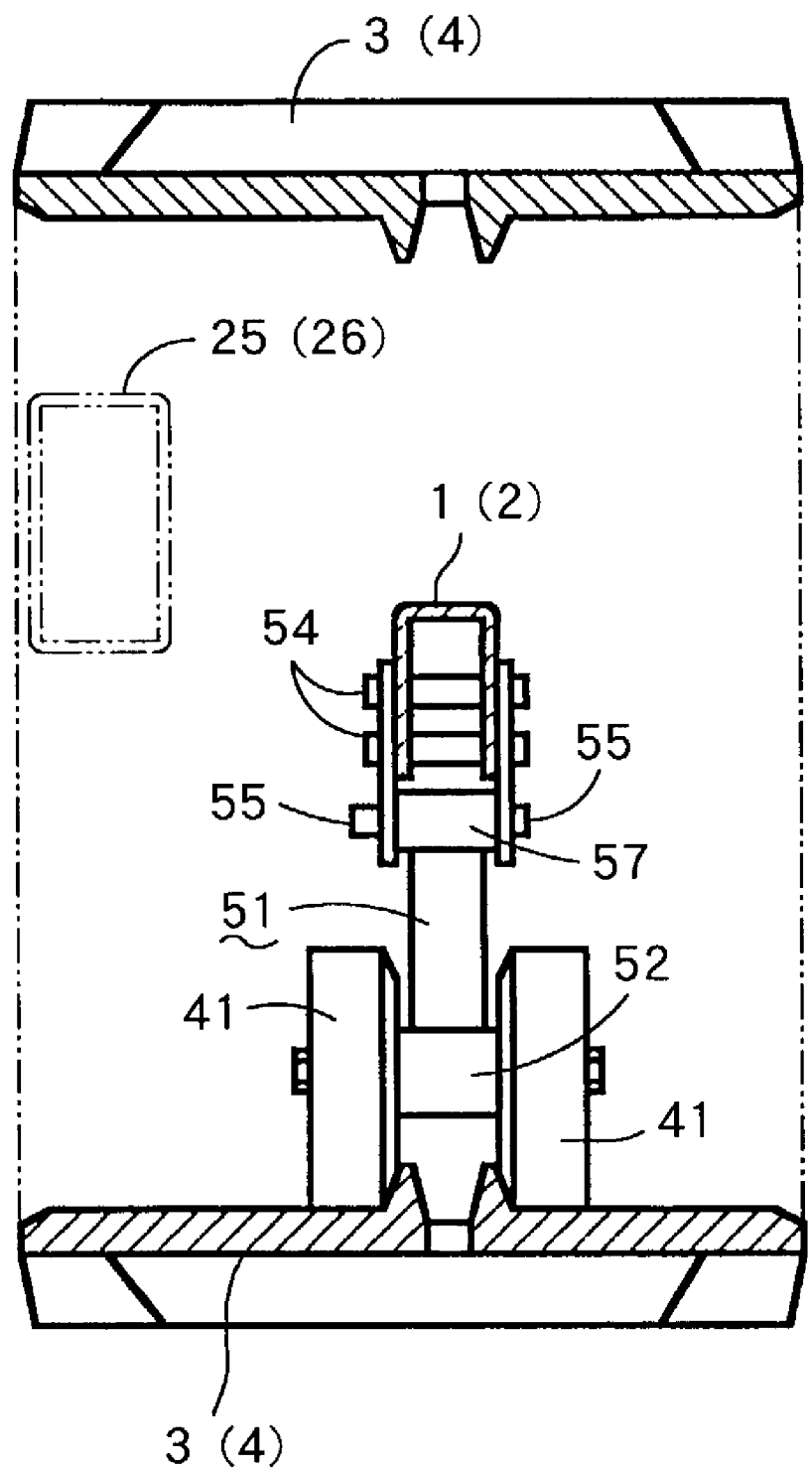
FIG. 11 is a front view of the same.
Figure 12:
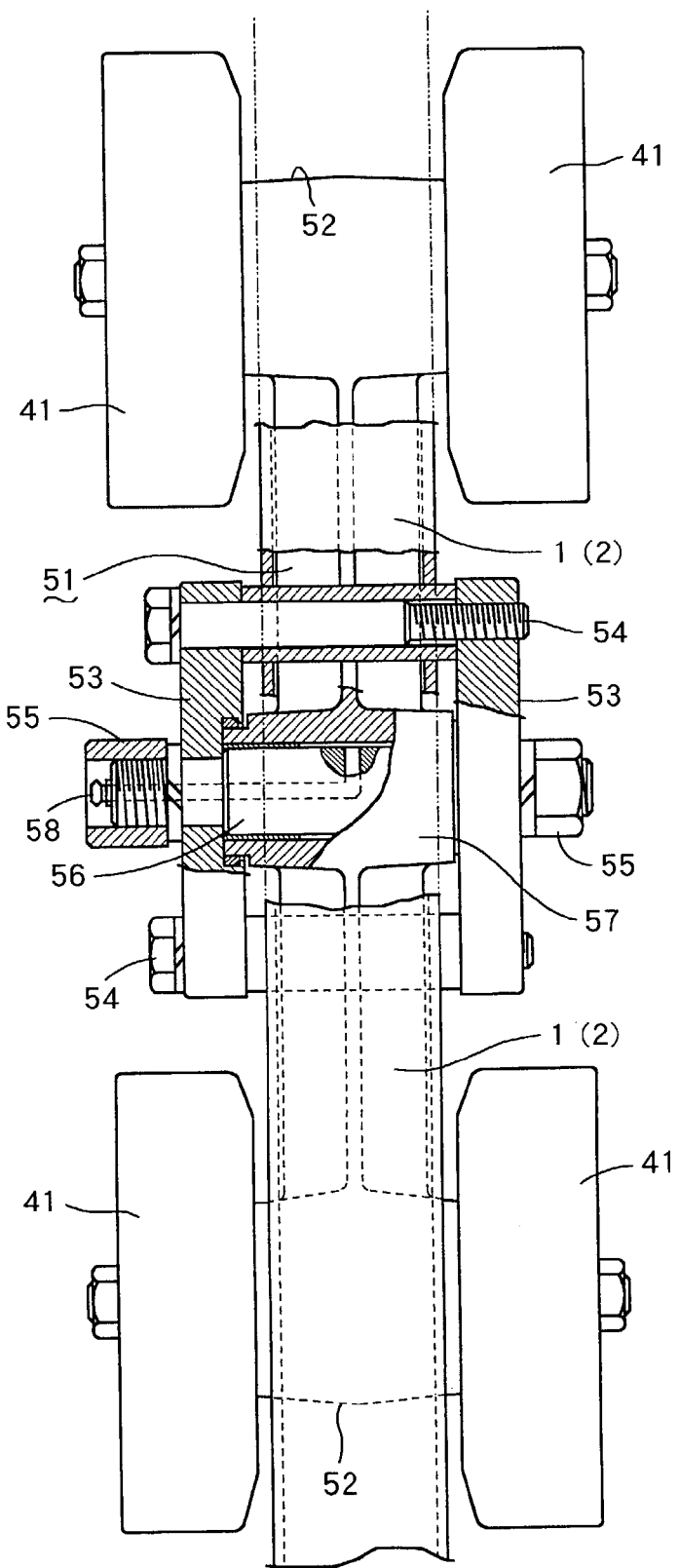
FIG. 12 is a plan view of the same.
Figure 13:
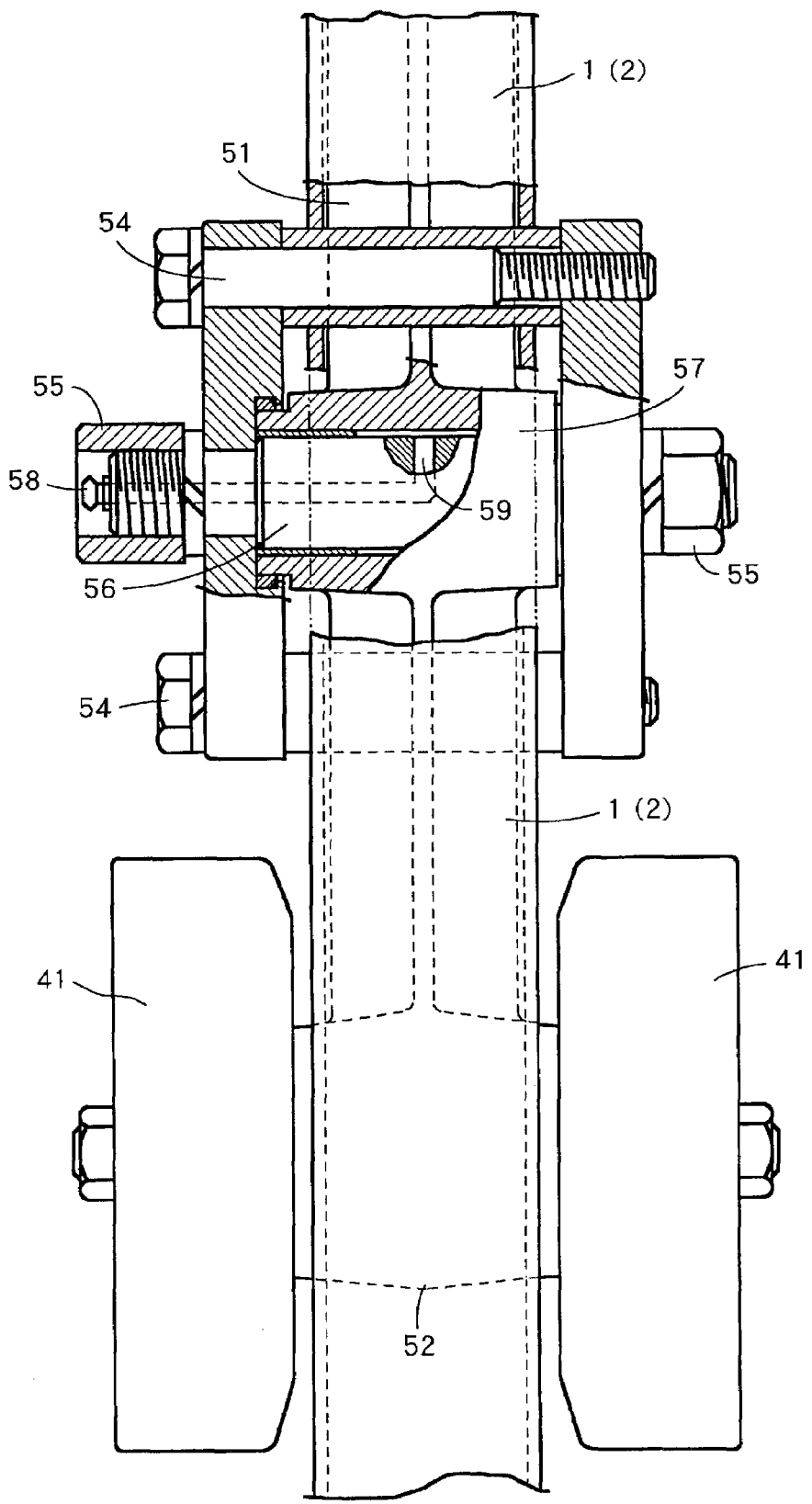
FIG. 13 is a partial enlargement view of the same.

As shown in FIGS. 7 through 9, connecting rods 34 commonly used as pistons are slid backward by driving elevation cylinders 35, upper swing arms 31 are rotated backward around fulcrum shafts 29 and 30, lower swing arms 32 are rotated downward around fulcrum shafts 29 and 30, track frames 1 and 2 are moved downward and forward, the ground contact side of travel crawlers 3 and 4 supporting track rollers 40 and equalizer rollers 41 are moved downward and forward to increase the ground height of platform 5, shafts 50 of each arm 32 and link 49 are raised around support shafts 33 by rotating the rear lower swing arms 32 downward, the front sides of tension frames 44 are raised from track frames 1 and 2 through seat plates 48, the rear sides of tension frames 44 are lowered toward slopes 1a and 2a, having low rear ends, of track frames 1 and 2 by tilting the rear idler links 47 backward, tension rollers 42 at the rear of tension frames 44 are lowered and moved backward and downward against track frames 1 and 2, the longitudinal ground contact width of travel crawlers 3 and 4 is enlarged toward the rear of track rollers 1 and 2 by moving tension rollers 42 backward and downward while keeping the perimeter of travel crawlers 3 and 4 almost constant, and ground contact length L1 of travel crawlers 3 and 4 supported between the foremost and rearmost of track rollers 40 is added to ground contact length L2 of travel crawlers 3 and 4 supported between the rearmost track rollers 40 and tension rollers 42 in order to extend the ground contact length L1+L2 of right and left travel crawlers 3 and 4 backward. By keeping the ratio of the ground contact length L=L1+L2 of right and left travel crawlers 3 and 4 at this time to the gauge width B, namely L/B at about 1.7 or less, an increase in the turning resistance resulting from an increase in the turning radius due to an increase in the ratio can be prevented. By extending the ground contact length of travel crawlers 3 and 4 backward, the longitudinal shift of the center of gravity of the machine body at the ground contact sides of travel crawlers 3 and 4 can be minimized, penetration of the rear of travel crawlers 3 and 4 into earth can be prevented, and enlargement of the ground contact area of travel crawlers 3 and 4 results in a decrease of the ground contact pressure per unit area, thereby reducing the amount of penetration of the rear of travel crawlers 3 and 4 into the earth.

As clearly shown by the above, in a combine where right and left travel crawlers 3 and 4 supported by drive sprockets 39 and tension rollers 42 serving as idle rollers are installed to right and left track frames 1 and 2 through track rollers 40, and where right and left track frames 1 and 2 are installed to the machine through swing arms 31 and 32 serving as the crawler elevation arms in an elevation action controllable manner, tension rollers 42 are provided in the direction of the ground contact of travel crawlers 3 and 4 in a movable manner. When the travel surface is soft, such as on a wet rice field, where the penetration amount of travel crawlers 3 and 4 increases, even if the elevation control action to lower track frames 1 and 2 is performed, the longitudinal ground contact length of travel crawlers 3 and 4 is extended by movement of tension rollers 42, the longitudinal shift of the gravity center of the machine body against the ground contact surface of travel crawlers 3 and 4 is reduced to maintain the longitudinal balance, enlargement of the ground contact area of travel crawlers 3 and 4 results in a decrease of the ground contact pressure, the penetration of travel crawlers 3 and 4 is reduced to improve the travel performance for a direction change, and on, for example, a hard travel surface, such as a dry rice field or an agricultural road, the longitudinal ground contact length of travel crawlers 3 and 4 is reduced to secure the specified turning performance.

The rear idler links 47 serving as the link mechanism are provided to track frames 1 and 2 in a rotatable manner, tension frames 44 installing tension rollers 42 in a tension adjustable manner are provided to rear idler links 47, tension rollers 42 are moved in a direction of lowering track frames 1 and 2 while moving away from each other, and the longitudinal ground contact length of the rear of travel crawlers 3 and 4 is increased or decreased by moving the tension rollers 42 backward and downward without changing the perimeter of travel crawlers 3 and 4. Thus, the structure of travel crawlers 3 and 4 is simplified, and an improvement in the travel performance is achieved. Furthermore, tension frames 44 installed with tension rollers 42 in a tension adjustable manner are moved in linkage with the elevation control action of swing arms 31 and 32, the ground contact length of the rear of travel crawlers 3 and 4 is increased or decreased by moving tension rollers 42 in a direction opposite to that of longitudinal movement of track frames 1 and 2 by the elevation control action, and a backward shift of the center of gravity of the machine body associated with the elevation control action is minimized to reduce a change in the ground contact pressure at the rear of travel crawlers 3 and 4, thereby eliminating conventional problems, such as excessive penetration of the rear of travel crawlers 3 and 4 caused by the elevation control action, and improving travel performance such as turning ability on a wet rice field or at the bare end area of a field where the penetration of travel crawlers 3 and 4 increases.

Actions in which the front sides of travel crawlers 3 and 4 are supported by drive sprockets 39, the rear sides of travel crawlers 3 and 4 are supported by tension rollers 42, and track rollers 40 and track frames 1 and 2 are moved forward by machine body raising action of swing arms 31 and 32, are performed in linkage with the action in which tension rollers 42 are moved in the direction of the ground contact of travel crawlers 3 and 4. Thus the ground contact length is extended toward the rear of travel crawlers 3 and 4 at the elevation control action for raising the machine body to prevent improper penetration of the rear of travel crawlers 3 and 4, to prevent the machine from tilting backward caused by a difference in the penetration between the front and the rear of travel crawlers 3 and 4 due to movement of the center of gravity like conventional machines, and to achieve an improvement in the travel performance on a wet rice field.

As shown in FIGS. 10 through 13, two pairs of said equalizer rollers 41, the first and second pairs of which are located at the front and the rear, respectively, are supported by the front and rear axle bearing sections 52 at both ends of the equalizer frames 51 in a rotatable manner. The right and left fulcrum brackets 53 are fastened on the right and left sides of said track frames 1 and 2 with bolts 54, the equalizer fulcrum shafts 56 of both threaded ends fastened by nuts 55 are fixed on right and left brackets 53, fulcrum bearing sections 57 in the middle of width between the front and rear of equalizer frames 51 are supported by equalizer fulcrum shafts 56 in a rotatable manner, equalizer frames 51 are provided around equalizer fulcrum shafts 56 in a rotatable manner, the front and rear equalizer rollers 41 are provided in an up and down movable manner, and equalizer frames 51 are held and fastened between right and left fulcrum brackets 53, thereby simplifying the assembly work. The end surface of the equalizer fulcrum shaft 56 is provided with a grease injection nozzle 58, and grease is injected to the contact surface between fulcrum shaft 56 and fulcrum bearing section 57 through the nozzle 58 and the injection passage 59 formed in equalizer fulcrum shaft 56, thereby reducing heat generation and damage by wear at fulcrum shaft 56 or fulcrum bearing section 57.

Figure 14:
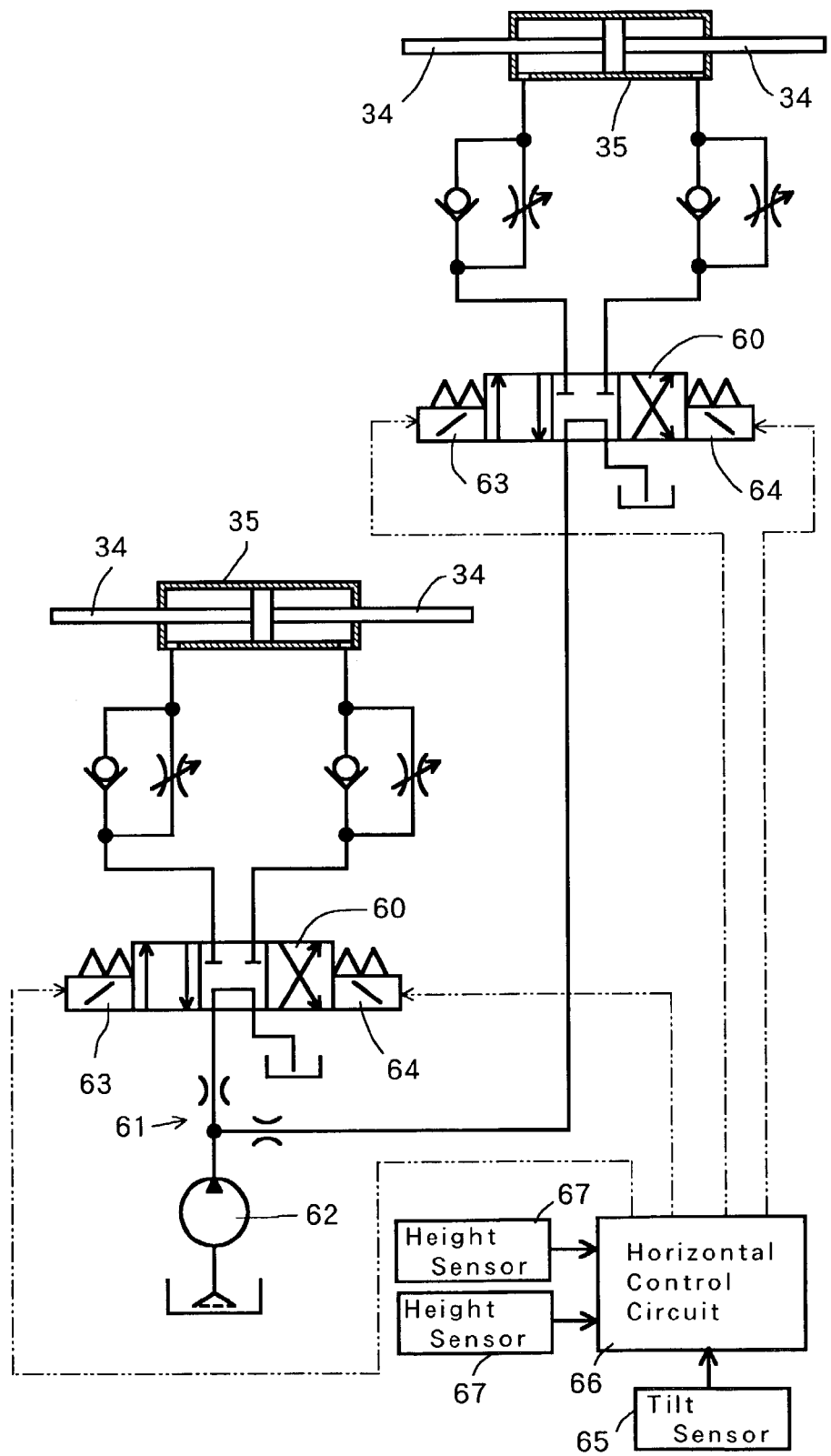
FIG. 14 is a hydraulic circuit diagram for elevation control.
Figure 15:
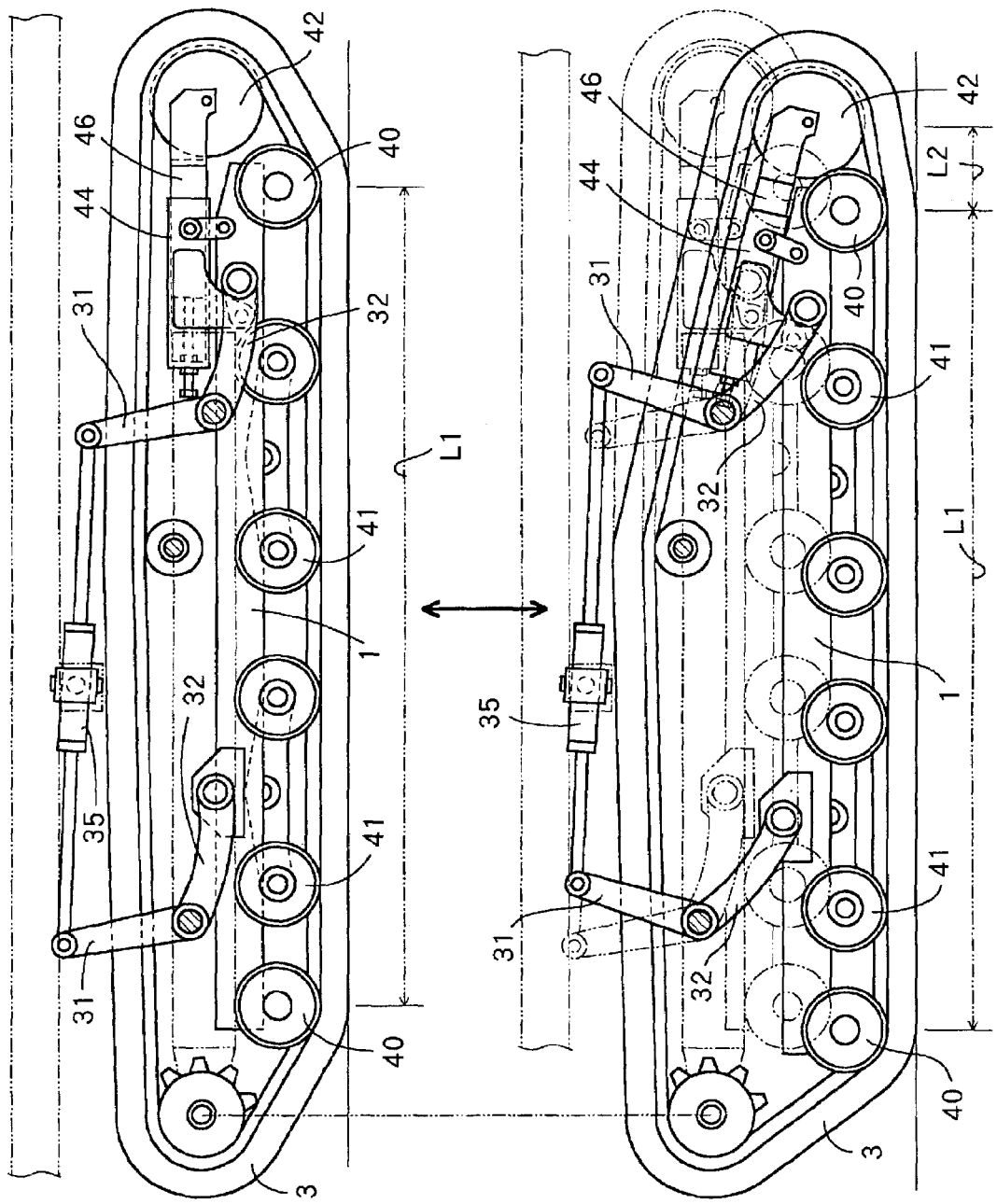
FIG. 15 is a diagram for explaining the elevation control action.

As shown in FIG. 14, elevation cylinders 35 are hydraulically connected to hydraulic pump 62 through hydraulic elevation valve 60, a 3-position 4-port solenoid switch type, and the flow-dividing valve 61. Elevation valve 60 is switched solenoids 63 and 64 to hydraulically drive the elevation cylinders 35 reciprocally to allow the front and rear pistons 34 to move forward and backward. The lateral tilt of platform 5 is detected by tilt sensor 65 and height sensor 67, and the solenoids 63 and 64 are energized by horizontal control circuit 66 allowing the horizontal and vertical controls to automatically drive right and left elevation cylinders 35. Thus the longitudinal ground contact length L1 of travel crawlers 3 and 4 is minimized when platform 5 is supported in a low position, and the longitudinal ground contact length L1+L2 of travel crawlers 3 and 4 is maximized when platform 5 is supported in a high position, as shown in FIG. 15. In addition, the machine is provided with right and left elevation cylinders 35 for individually elevating right and left track frames 1 and 2. The front and rear connecting rods 34 serving as the front and rear pistons are protruded toward both ends of elevation cylinders 35 connected to the front and rear crawler elevation arms, and elevation cylinders 35 are installed to the machine in a manner movable only upward and downward. Thus the installation width in the upward and downward directions can be made compact by connecting elevation cylinders 35 between the front and rear crawler elevation arms through front and rear connecting rods 34, and elevation control functions can be improved by providing elevation cylinders 35 with a double action hydraulic structure.

Figure 16:
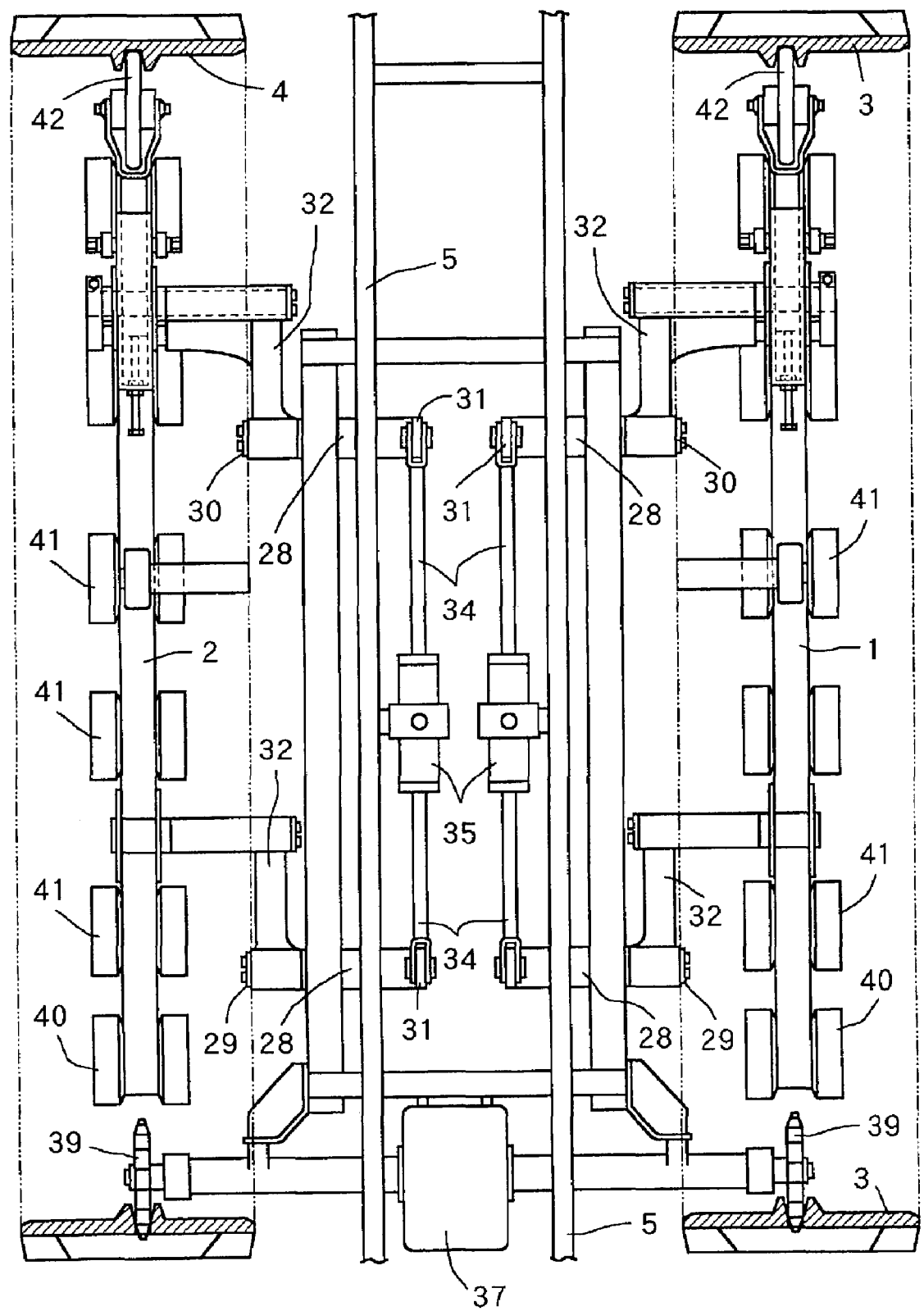
FIG. 16 is a plan view showing the modification of FIG. 5.
Figure 17:
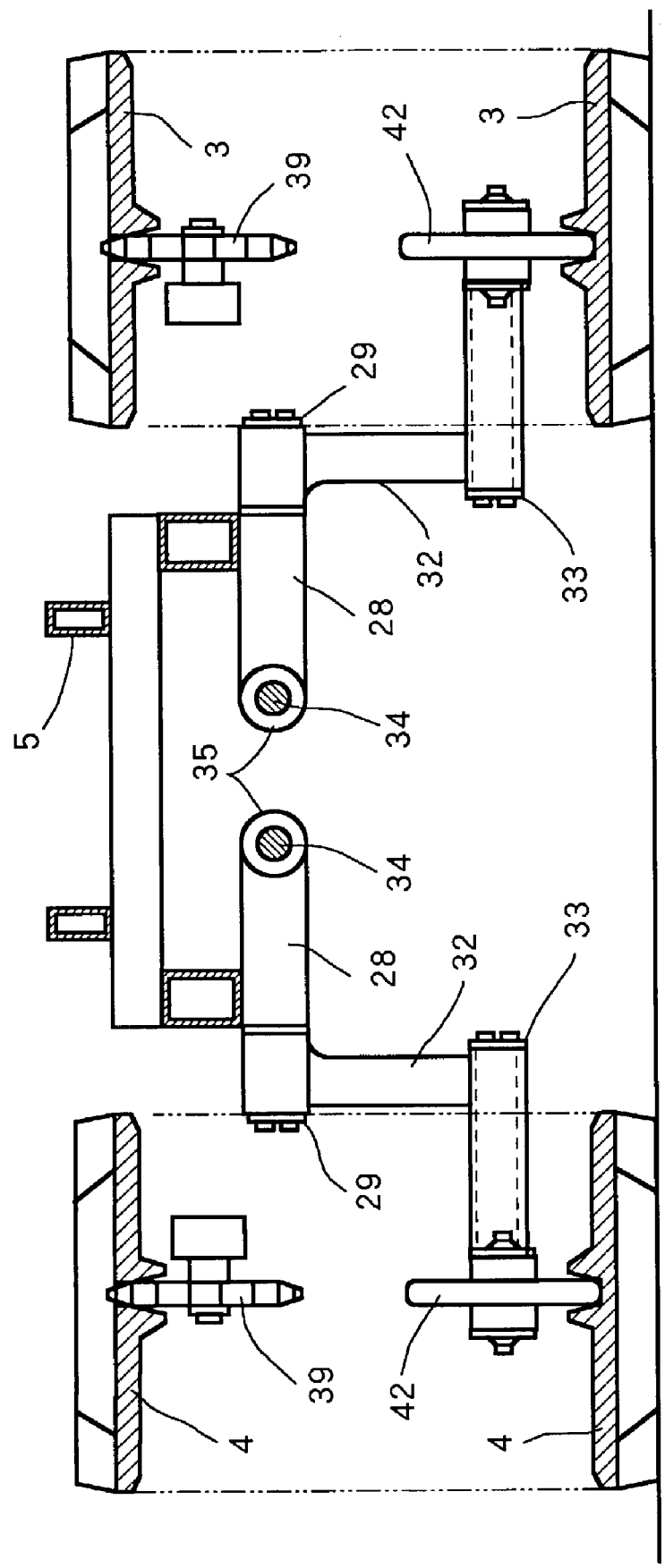
FIG. 17 is a front view for explaining FIG. 16.
Figure 18:
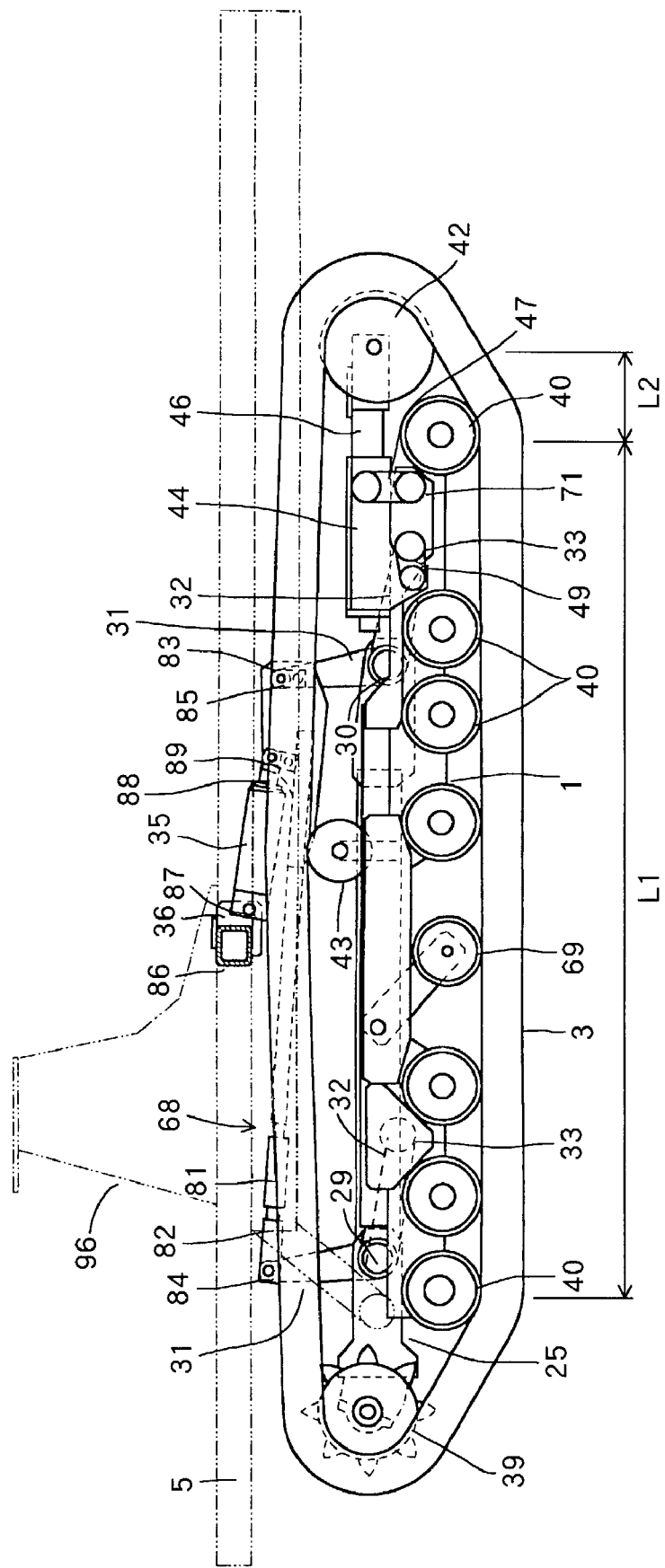
FIG. 18 is a side view of the travel crawler section.

As shown in FIGS. 16 and 17, upper and lower swing arms 31 and 32 are installed to the external sides of the lateral width of travel crawlers 3 and 4 inside the machine. Thus, interference of lower swing arms 32 with travel crawlers 3 and 4 or accumulation of mud can be prevented.

By the way, as shown in FIGS. 18 through 29, hydraulic elevation cylinders 35 are connected between connecting members 68, which connects the front and rear upper swing arms 31. Furthermore, track rollers 40, movable rollers 69, and tension rollers 42 are installed to track frames 1 and 2 to provide the ground contact side of travel crawlers 3 and 4 with tension, and right and left elevation cylinders 35 are individually actuated to perform the elevation control to correct the lateral tilting of platform 5.

Track frames 1 and 2 fix a pair of right and left seat plates 70 on both sides of the rear, and connect shafts 50 and 72 at both sides of tension frames 44 to support shafts 33 and link shafts 71, which penetrate between right and left seat plates 70, through front and rear idler links 49 and 47.

In a combine, two pairs of bolt mounting seats 73 are fixed in 180-degree symmetrical positions at the external sides of the front ends of tension frames 44, bolt receivers 75 are fixed on said mounting seats 73 with two fastening bolts 74 in a detachable manner, and tension bolts 45 are arranged almost in the middle of nut receiving plate 76 and bolt receiver 75, which are installed to the inside of the front of idler frames 46. Thus hexagonal head sections 45a of tension bolts 45 are externally protruded from through holes 77 of bolt receivers 75, flange section 45b is applied to the internal surface of bolt receiver 75, nut 78 for connecting to tension bolt 45 is applied to an external surface of nut receiving plate 76, square locking member 79 of which the outline is located along the internal side of tension frame 44 is fixed on nut 78, and idler frame 46 is extended from tension frame 44 by operating tension bolt 45 rotationally from the outer side of bolt receiver 75, allowing tension rollers 42 to provide travel crawlers 3 and 4 with tension in an adjustable manner.

In the combine, as shown in FIG. 21 (1), in a condition that track frames 1 and 2 come closest to platform 5 at full retraction of elevation cylinders 35 and the elevation control action of elevation cylinders 35 is stopped, rear idler links 47 are installed almost vertically, and front idler links 49 are protruded almost horizontally in a forward direction from support shafts 33. Furthermore, as shown in FIGS. 21 (2) and (3), when elevation cylinders 35 are driven to slide connecting members 68 backward, upper swing arms 31 are rotated backward around fulcrum shafts 29 and 30, lower swing arms 32 are rotated downward around fulcrum shafts 29 and 30, and track frames 1 and 2 are moved downward and forward. The ground height of platform 5 is thus increased, shafts 50 of front idler links 49 are raised around support shafts 33 by rotating lower swing arms 32 of the rear downward, the front sides of tension frames 44 are raised from track frames 1 and 2, rear idler links 47 are tilted backward, and tension rollers 42 of the rear of tension frames 44 are lowered to be moved backward and downward against track frames 1 and 2. Consequently, the longitudinal ground contact width of travel crawlers 3 and 4 can be extended while keeping the perimeter of travel crawlers 3 and 4 almost constant in comparison with a conventional machine.

Figure 23:
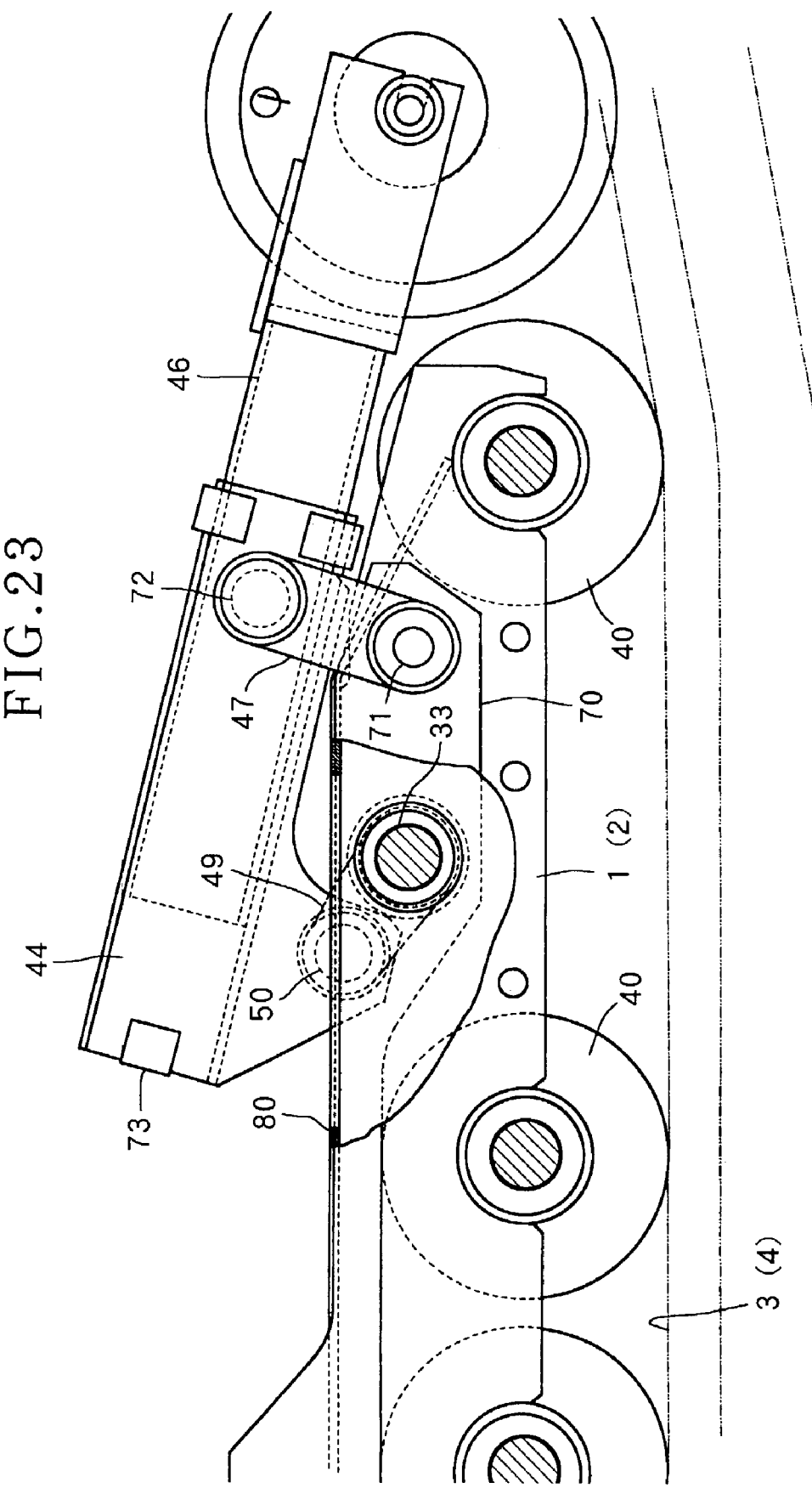
FIG. 23 is a diagram for explaining the opening.
Figure 24:
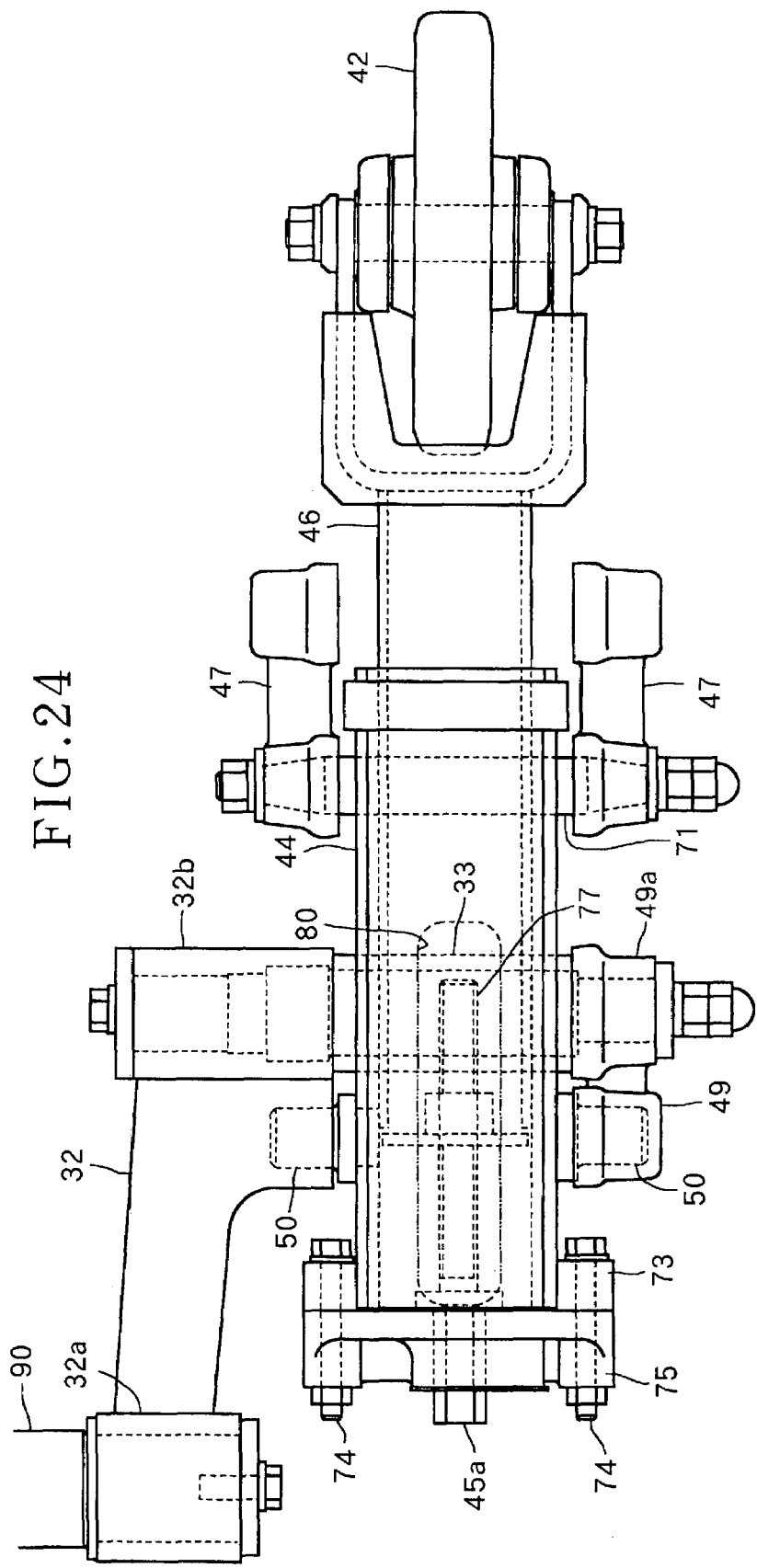
FIG. 24 is a plan view of the tension roller section.
Figure 29:
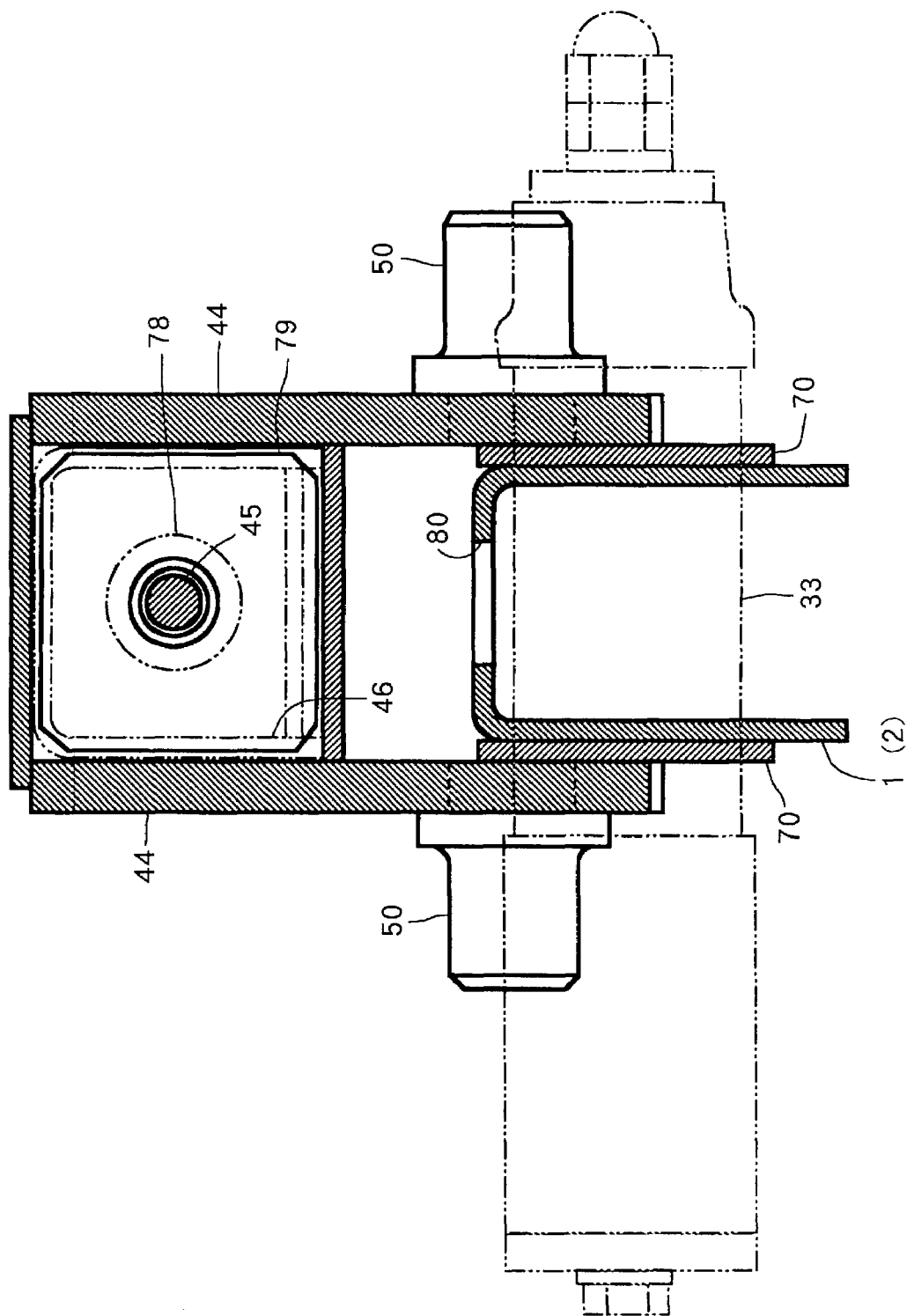
FIG. 29 is a sectional view for explaining the tension bolt section.

As shown in FIGS. 23 and 29, the opening 80 with a certain length is formed on the tops of track frames 1 and 2 below tension frames 44, thus problems such that mud or stones caught in the clearance between track frames 1 and 2 and tension frames 44 resulting in elevation control failure can be prevented by allowing the mud or stones to fall through opening 80.

Cylinder receiving plates 83 are fixed on the rear ends of length adjusting rods 82 with turn buckles 81 to constitute connecting members 68. Rods 82 and cylinder receiving plates 83 are connected to the top ends of front and rear swing arms 31 through shafts 84 and 85, elevation cylinders 35 are installed to brackets 36 fixed on the rear surface of machine frame 86 of platform 5 through shafts 87, the ends of piston 88 of elevation cylinders 35 are connected to cylinder receiving plates 83 through shafts 89, and shafts 85, 87 and 89 are provided on the extension lines of the shaft centers of pistons 88 of elevation cylinders 35. Thus, the extension force of pistons 88 can be prevented from acting on cylinder receiving plates 83 as a compressive force to cause deformation, and compact and light cylinder receiving plates 83 can be achieved.

As also shown in FIGS. 24, 25, 28 and 29, lower swing arm 32 connecting to the rear swing arm 31 through swing shaft 90 is allowed to commonly use front idler link 49. The middle of said arm 32 is connected to shaft 50 to reduce the number of parts, and track frames 1 and 2 and tension frames 44 are connected in a both ends supported condition using swing arms 32 and four idler links consisting of front idler links 47 and right and left rear idler links 47 to make the connection with compact size and appropriate strength.

Figure 25:
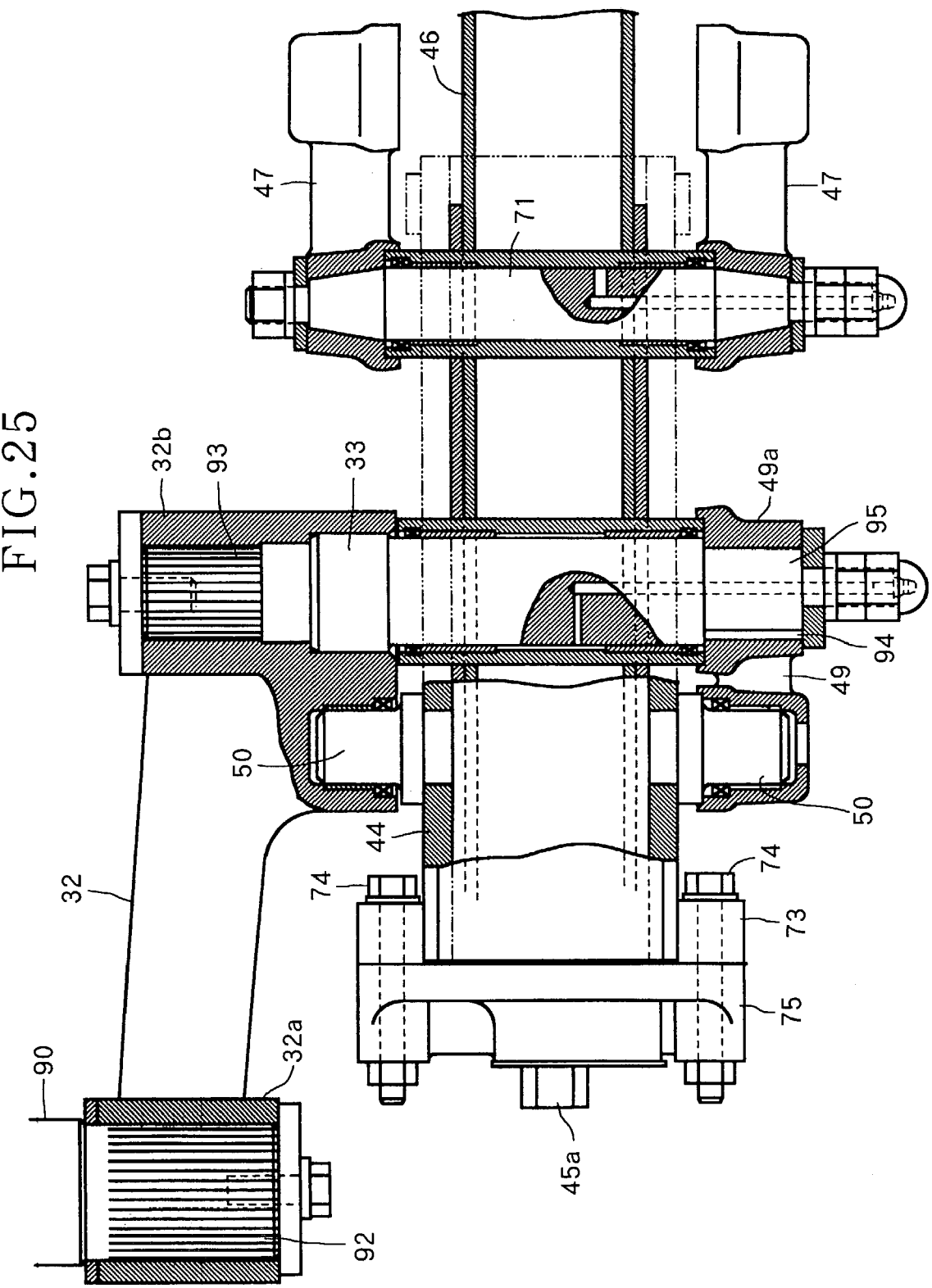
FIG. 25 is a plan view for explaining the tension roller section.
Figure 26:
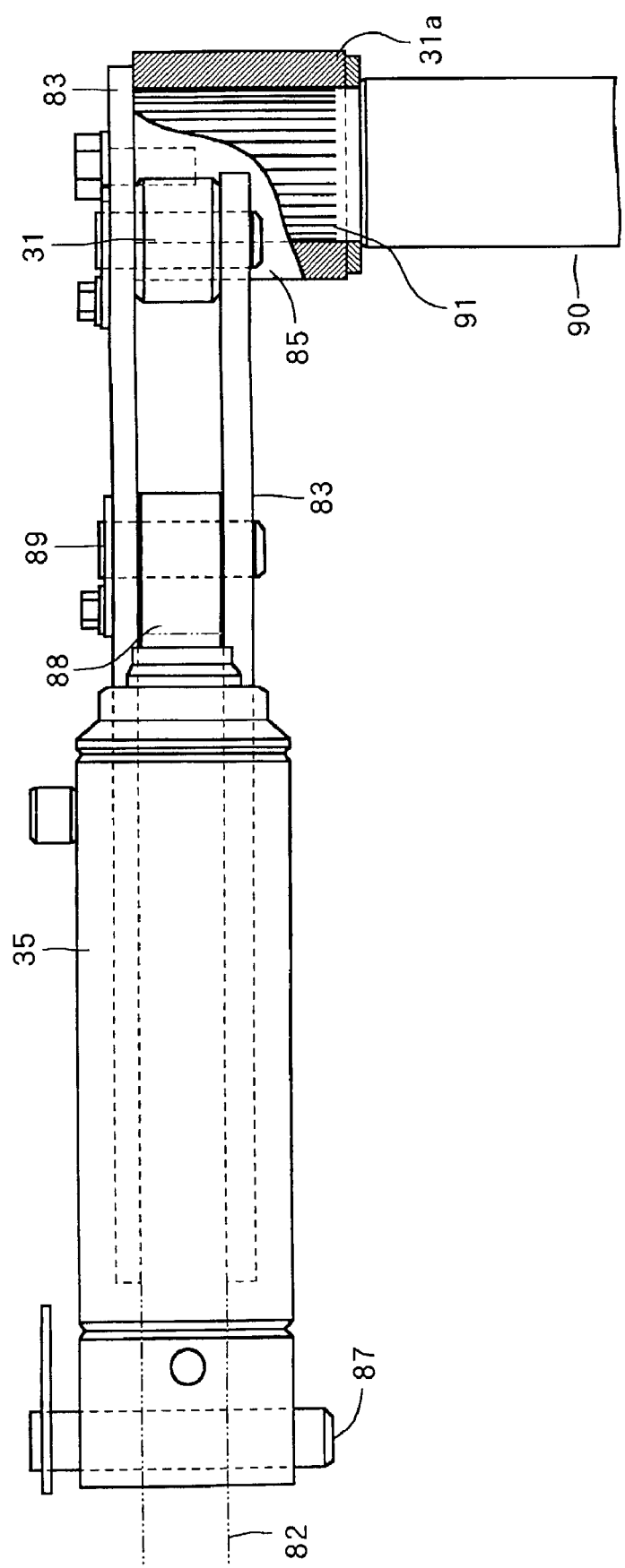
FIG. 26 is a plan view for explaining the elevation cylinder.
Figure 27:
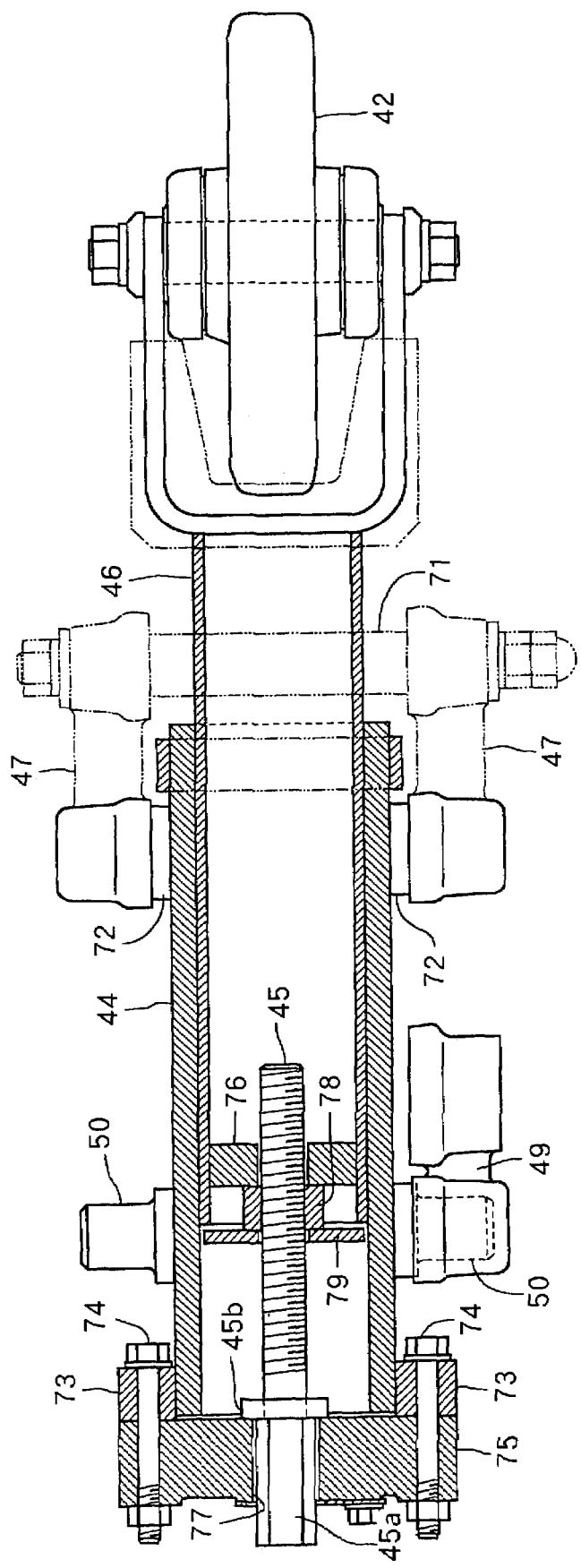
FIG. 27 is a diagram for explaining the tension bolt section.
Figure 28:
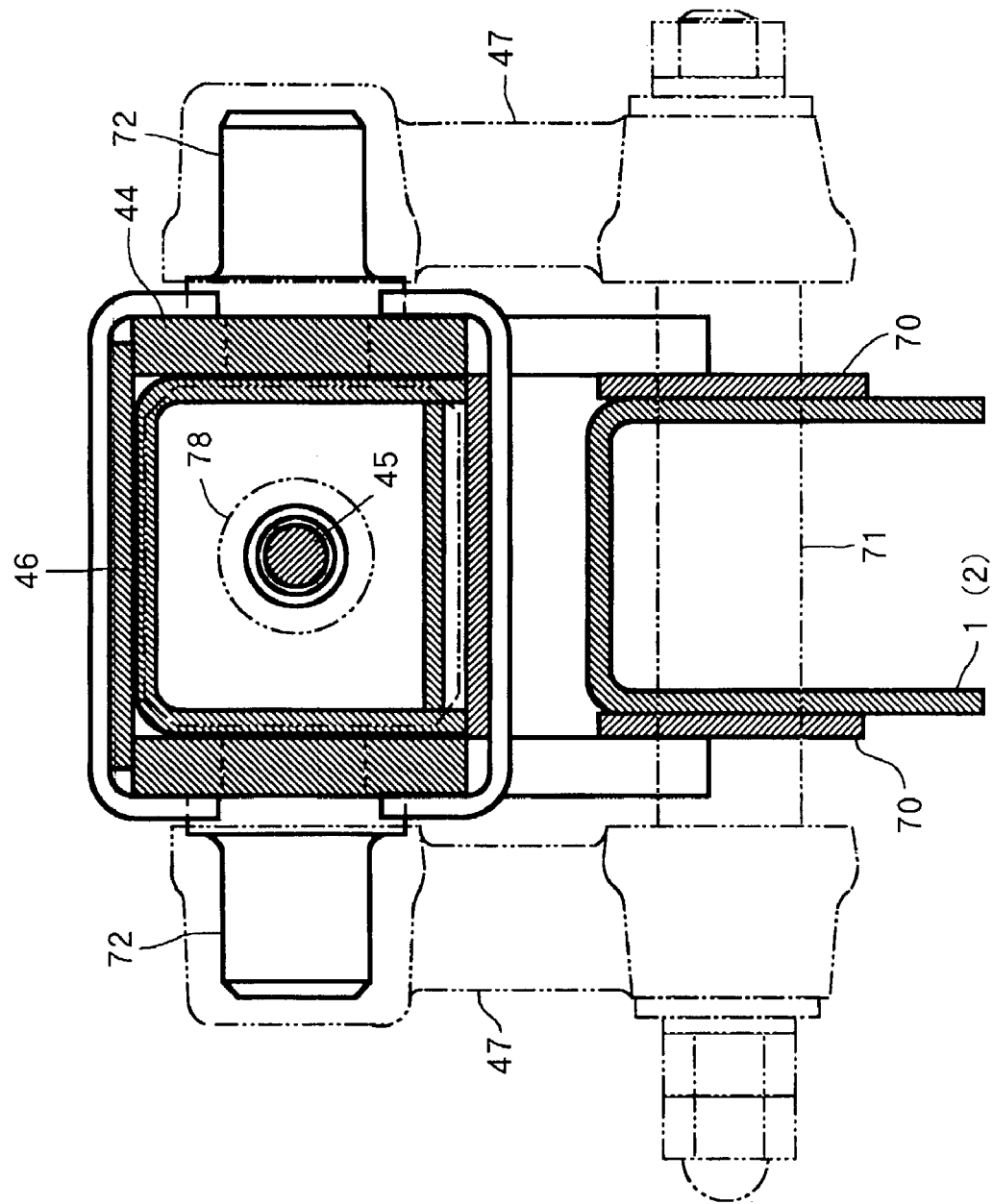
FIG. 28 is a sectional view for explaining the tension frame section.

As shown in FIGS. 25 and 26, spline shaft section 91 at the internal end of swing shaft 90 is connected to end boss section 31a of rear swing arm 31 connected to cylinder receiving plate 83 through shaft 85. End boss section 32a of lower swing arm 32 is connected to spline shaft section 92 at the external end of swing shaft 90, and end boss section 32b of lower swing arm 32 and base end boss section 49a of front idler link 49 are connected to internal end spline shaft section 93 of support shaft 33 and shaft section 95 with the external end key 94, respectively. Thus swing arms 31 and 32 at the rear outer and inner sides, lower swing arm 32 and support shaft 33, and support shaft 33 and front idler link 49 are provided with the relative position relation, and idler link 49 can be installed in an appropriate position relative to elevation cylinder 35, thereby facilitating the assembly work.

Figure 22:
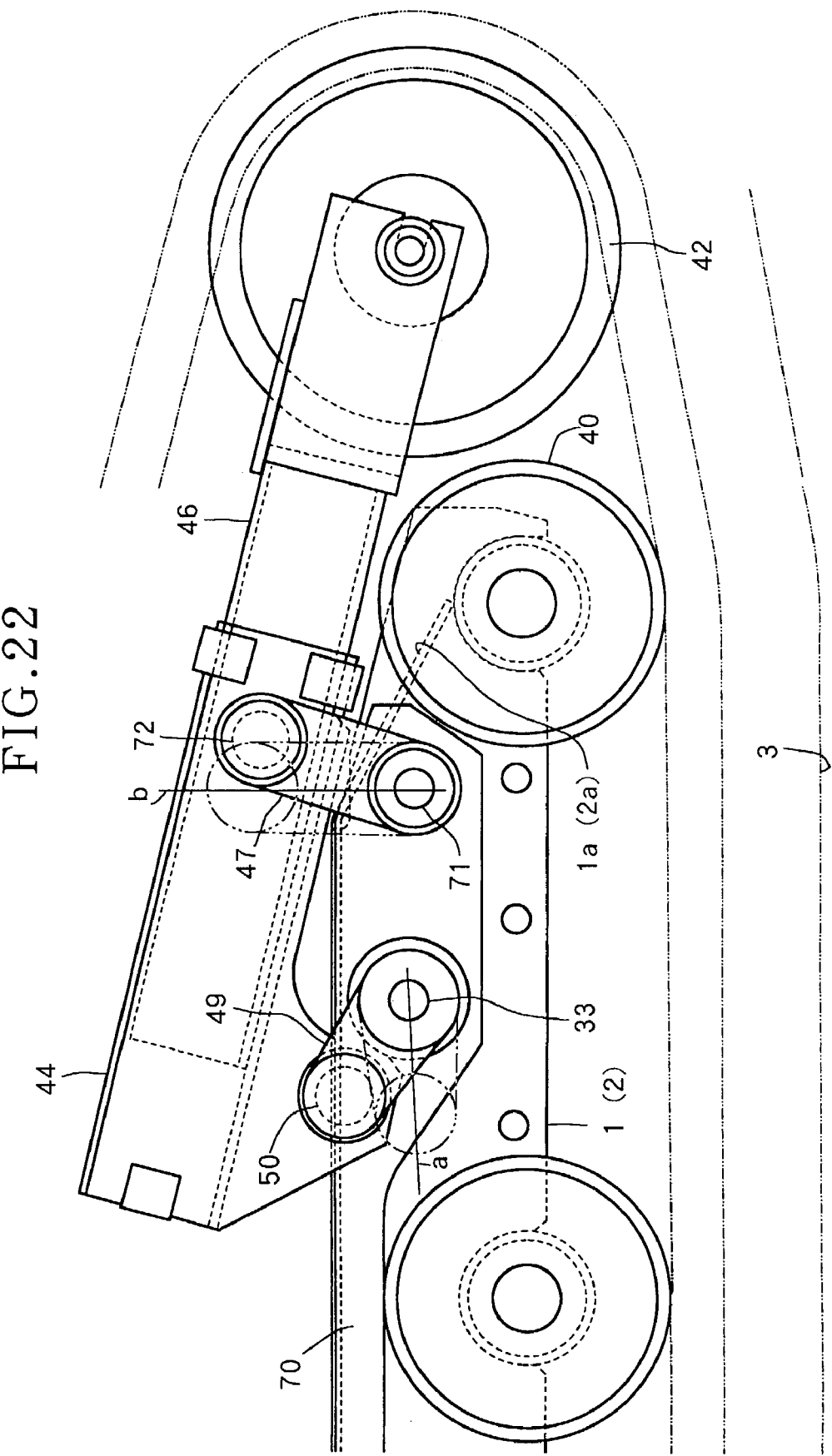
FIG. 22 is a side view for explaining the tension roller section.

As shown in FIG. 22, idler links 47 and 49 are formed so that the link of rear idler link 47 is longer than that of front idler link 49. Front idler link 49 and rear idler link 47 are located almost horizontally ("a" line) and almost vertically ("b" line), respectively, at full retraction of elevation cylinder 35. Front idler link 49 is moved up around support shaft 33 when elevation cylinder 35 is extended, and rear idler link 47 is rotated backward around link shaft 71. Thus the amount of upper movement of front idler link 49 just after extension of elevation cylinder 35 is increased, the amount of backward swing of rear idler link 47 is increased, the amount of initial movement of tension frame 44 from almost the horizontal posture is increased, and only the lower part of tension roller 42 of the rear is moved down, therefore tension roller 42 can be moved backward and downward while minimizing a change in the perimeter of travel crawlers 3 and 4.

In addition, numeral 96 is reaping fulcrum base fixed on the top of platform 5 for supporting elevation fulcrum shafts of reaping section 10, and numeral 97 is a roller shaft, of which the base ends are fixed on the top of frames 25 and 26 of the machine for supporting carrier rollers 43 at the horizontally protruding outer end.

Figure 19:
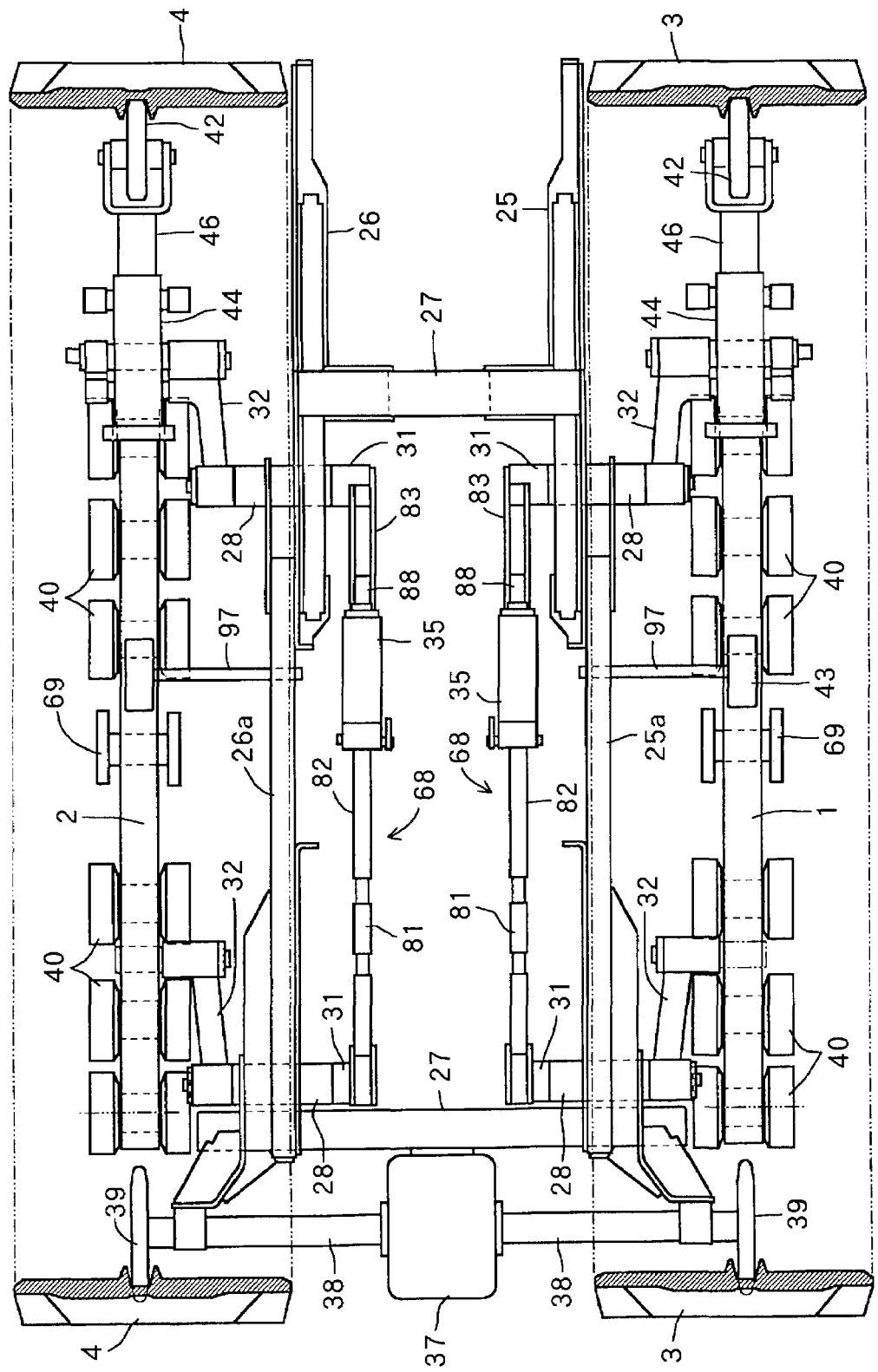
FIG. 19 is a plan view of the travel crawler section.
Figure 20:
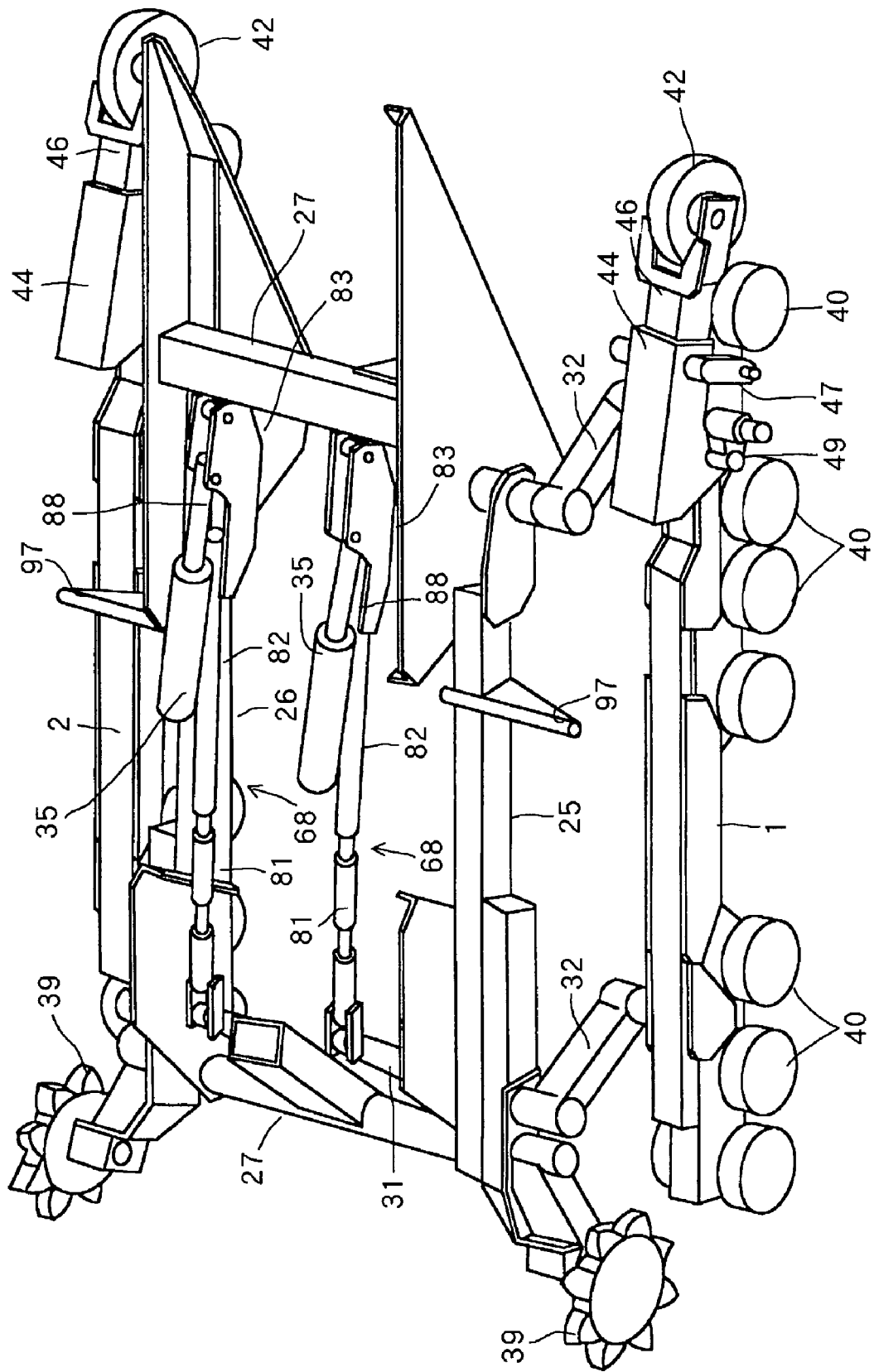
FIG. 20 is a perspective view for explaining the frame section of the machine.

As shown in FIG. 19, lower frames 25 and 26 at the lower part of the machine are connected to track frames 1 and 2 through lower swing arms 32. Lower frames 25 and 26 at the lower part of the machine are provided with inside frame sections 25a and 26a located inside travel crawlers 3 and 4. Inside frame sections 25a and 26b are provided with bearing bodies 28 supporting front and rear fulcrum shafts 29 and 30, and lower swing arms 32 are also located inside travel crawlers 3 and 4. Thus lower swing arms 32 are located inside travel crawlers 3 and 4 in a compact manner without being allowed to protrude outward from travel crawlers 3 and 4 to improve mud discharge ability and to enable swing arms 32 to swing smoothly. Frames 25 and 26 located outside of crawlers 3 and 4 are extended backward without regard to crawlers 3 and 4, thereby increasing freedom of positioning of lateral frame 27 connecting these frames 25 and 26 to improve overall rigidity of frames 25 and 26.

As clearly shown above, in a combine where right and left track frames 1 and 2 are supported by the machine through swing arms 31 and 32 in a movable up and down manner, and tension rollers 42 providing travel crawlers 3 and 4 with tension are supported by track frames 1 and 2 through idler links 47 and 49 in a tension adjustable manner, idler frames 46 having tension rollers 42 are connected to tension frames 44 in an extendable manner, and idler frames 46 are indirectly connected to tension frames 44 through tension bolts 45 and nuts 78. Thus performance stability can be easily maintained by only replacing tension bolts 45, even if the extension screw sections of idler frames 46 are damaged.

Nut 78 is applied to the almost central part of idler frame 46 to press idler frame 46 to prevent tension frame 44 from sticking in idler frame 46 to secure smooth extending and retracting actions.

Bolt receiving member 75 supporting tension bolt 45 is connected to tension frame 44 through fastening bolts 74, which are arranged in equal pitch at the symmetrical position from the center of tension bolt 45. Thus, forces acting on each fastening bolt 74 can be almost equalized to improve support stability by tension bolt 45.

Swing arms 31 and 32 are connected to idler links 47 and 49 while keeping the relative mounting position, and track frames 1 and 2 and tension rollers 42 are properly connected to elevation cylinders 35. Thus, assembly work can be facilitated and elevation controllability of track frames 1 and 2 can be improved.

Tension frames 44 for installing tension rollers 42 and track frames 1 and 2 are formed separately, and the relative position between track frames 1 and 2 and tension frames 44 is changeable at the time of elevation control of right and left track frames 1 and 2. Thus the change of the perimeter of the crawler at the elevation control can be absorbed by movement of track frames 1 and 2 and tension roller 42 to always support travel crawlers 3 and 4 appropriately to improve durability of travel crawlers 3 and 4.

Tension frames 44 are connected to both right and left sides of track frames 1 and 2 through idler links 47 and 49, and idler links 47 and 49 are provided with both ends supported. Thus, tension frames 44 and track frames 1 and 2 can be connected compactly with sufficient strength to improve stability during elevation control.

Swing arm 32 is connected to tension frame 44 through front idler link 49 serving as an auxiliary arm, and idler link 49 is installed almost in parallel with the direction of tension of tension roller 42. Thus, torsion by the tensioning action acting on support shaft 33 serving as a connecting shaft connecting tension frame 44 and idler link 49 can be limited to improve durability and achieve smooth rotation of tension frame 44 around support shaft 33.

Swing arms 31 and 32 and idler links 47 and 49 are provided to minimize the change in the perimeter of travel crawlers 3 and 4. Thus, travel crawlers 3 and 4 can be supported by drive sprockets 39, track rollers 40, and tension rollers 42 in a good condition to stably maintain travel performance without relating to the elevation control.

Piston 88 of elevation cylinder 35 is connected to connecting member 68 between front and rear elevation arms 31 and 32 connecting right and left track frames 1 and 2 and the machine. Thus elevation arms 31 and 32 can be made compact and light in comparison with, for example, piston 88 of elevation cylinder 35 directly connected to elevation arms 31 and 32, and therefore common use and cost reduction of each part of front and rear elevation arms 31 and 32 formed as an identical shape can be achieved.

Carrier rollers 43 guiding travel crawlers 3 and 4 from the bottom are installed to the side of the machine, and carrier rollers 43 are arranged between the front and rear elevation arms 31 and 32. Thus carrier rollers 43 are raised away from track frames 1 and 2 to protect from mud when the machine is controlled to lower track frames 1 and 2 in a wet rice field and so on, and fulcrum shafts 29 and 30 of elevation arms 31 and 32 connected to the sides of the machine can be effectively prevented from interfering with travel crawlers 3 and 4 to stably maintain the travel performance.

The top surfaces of track frames 1 and 2 below tension frames 44 are provided with openings 80 for mud falls, allowing mud and stones to immediately fall down to prevent problems, such as elevation control failure, even if mud or stones are caught in the clearance between track frames 1 and 2 and tension frames 44, and thus elevation control accuracy in correcting lateral tilt of the machine can be improved.

Lower frames 25 and 26 of the machine connected to track frames 1 and 2 are provided with inside frame sections 25a and 26a located inside travel crawlers 3 and 4, and inside frame sections 25a and 26a are provided with bearing bodies 28 serving as the fulcrum shaft sections of the lower swing arms 32. Thus, the lower swing arms 32 can be also compactly arranged inside travel crawlers 3 and 4 without being allowed to externally protrude from travel crawlers 3 and 4 to improve mud discharge ability.

What is claimed is:

1. A mobile agricultural machine, comprising:
   right and left track frames;
   right and left travel crawlers;
   drive sprockets, at a front of said machine for supporting said travel crawlers;
   tension rollers, at a rear of said machine, in said right and left track frames, for supporting said travel crawlers;
   track rollers, in said right and left track frames, for supporting said travel crawlers between said drive sprockets and said tension rollers;

crawler elevation arms, for attaching said right and left track frames to said machine, in a manner wherein elevation of said right and left track frames relative to said machine is adjustable by said crawler elevation arms;

idler frames, for supporting said tension rollers;

tension frames, for movably supporting said idler frames in a back and forth manner;

a link mechanism, having a front idler link and a rear idler link, for connecting front sides of said tension frames to said crawler elevation arms by way of said front idler link and connecting rear sides of said tension frames to said track frames by way of said rear idler link, such that:

in a lowered position a platform of said machine is adjacent to said track frames and said tension frames assume a nearly horizontal position; and during ascension, said platform is elevated with respect to said track frames, the front side of said tension frames are raised, and said tension rollers move in a nearly vertical downward direction.

2. The mobile agricultural machine according to claim 1, wherein said idler frames are position-adjustable with respect to said tension frames.

3. The mobile agricultural machine according to claim 1, further comprising:

elevation cylinders, for hydraulically driving said crawler elevation arms; and connecting rods, movably connected to said elevation cylinders, so that said elevation cylinders are capable of back and forth motion, said connecting rods being connected to said crawler elevation arms;

said elevation cylinders being supported by said machine such that said elevation cylinders are capable of swinging about an axis along a crosswise direction of said machine.

4. The mobile agricultural machine according to claim 1, wherein said idler frames are connected to said tension frames in an adjustable manner through tension bolts and nuts.

5. The mobile agricultural machine according to claim 4, wherein a nut at a substantially central part of said idler frame exerts pressure on said idler frame.

6. The mobile agricultural machine according to claim 4, wherein a bolt-receiving member, supporting said tension bolts, is connected to said tension frame through fastening bolts, which are arranged in an equal pitch at a symmetrical position from a center of said tension bolt.

7. The mobile agricultural machine according to claim 4, wherein a top of said frank frame, below said tension frame, is provided with an opening for allowing accumulated mud on said track frame to fall.

* * * * *